(12) United States Patent
Hara

(10) Patent No.: US 12,230,915 B2
(45) Date of Patent: Feb. 18, 2025

(54) CONNECTOR UNIT, IMAGE FORMING APPARATUS, AND SHEET PROCESSING APPARATUS

(71) Applicant: CANON KABUSHIKI KAISHA, Tokyo (JP)

(72) Inventor: Yoshiaki Hara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/500,990

(22) Filed: Nov. 2, 2023

(65) Prior Publication Data

US 2024/0079822 A1    Mar. 7, 2024

Related U.S. Application Data

(63) Continuation of application No. 17/665,336, filed on Feb. 4, 2022, now Pat. No. 11,843,198.

(30) Foreign Application Priority Data

Feb. 15, 2021    (JP) ................................. 2021-021683

(51) Int. Cl.
*H01R 13/629*    (2006.01)
*H01R 13/627*    (2006.01)
(Continued)

(52) U.S. Cl.
CPC ....... *H01R 13/629* (2013.01); *H01R 13/6273* (2013.01); *H01R 13/6395* (2013.01);
(Continued)

(58) Field of Classification Search
CPC .... H01R 13/743; H01R 13/629; H01R 13/74; H01R 13/6273; H01R 13/6395; H04N 1/00907; H04N 1/00639
(Continued)

(56) References Cited

U.S. PATENT DOCUMENTS 2,424,757 A    7/1947    Klump .................... F16B 21/08
4,813,885 A    3/1989    Colleran et al. .............. 439/565
(Continued)

FOREIGN PATENT DOCUMENTS

JP    S56-99890 U    8/1981
JP    H02-46670    2/1990
(Continued)

OTHER PUBLICATIONS

Office Action dated Aug. 27, 2024 in counterpart Japanese Application No. 2021-021683, together with English translation thereof.

*Primary Examiner* — Gary F Paumen
(74) *Attorney, Agent, or Firm* — Venable LLP

(57) ABSTRACT

A connector unit includes a connector mounting member having a mounting hole, and a connector passed through the mounting hole and attached to the connector mounting member. The connector includes a terminal portion to which another connector is configured to be connected, and a hook portion engaged with an edge portion of the mounting hole. The connector mounting member includes a panel portion on which the mounting hole is formed, an extending portion extending from the panel portion along an inserting direction of the another connector with respect to the connector, and a regulating portion projected from the extending portion at a position abutting against or close to an end portion opposite to the terminal portion of the connector in the inserting direction. A distance between the regulating portion and the panel portion is shorter than a distance between the terminal portion of the connector and the end portion.

10 Claims, 19 Drawing Sheets

(51) Int. Cl.
    *H01R 13/639*     (2006.01)
    *H01R 13/74*     (2006.01)
    *H04N 1/00*     (2006.01)

(52) U.S. Cl.
    CPC ......... *H01R 13/74* (2013.01); *H04N 1/00907* (2013.01); *H01R 2201/18* (2013.01); *H04N 1/00639* (2013.01)

(58) Field of Classification Search
    USPC ....................................................... 439/557
    See application file for complete search history.

(56) References Cited

U.S. PATENT DOCUMENTS

| | | | |
|---|---|---|---|
| 5,607,323 A | 3/1997 | Foster et al. | G02B 6/38 |
| 5,980,313 A | 11/1999 | Kunishi et al. | H01R 13/74 |
| 6,206,731 B1 | 3/2001 | Kuo | H01R 13/6582 |
| 6,238,242 B1 | 5/2001 | Hwang | H01R 13/74 |
| 7,413,472 B2 | 8/2008 | Iijima | H01R 13/60 |
| 8,942,001 B2 | 1/2015 | Kawai et al. | H05K 5/06 |
| 9,504,318 B1 | 11/2016 | O'Keefe et al. | H01R 13/60 |
| 11,843,198 B2 * | 12/2023 | Hara | H01R 13/6395 |
| 2003/0032319 A1 | 2/2003 | Sturgeon et al. | H01R 13/74 |
| 2008/0064257 A1 | 3/2008 | Iijima | H01R 13/73 |

FOREIGN PATENT DOCUMENTS

| | | |
|---|---|---|
| JP | H05-275868 A | 10/1993 |
| JP | H07-29638 A | 1/1995 |
| JP | H11-249357 A | 9/1999 |
| JP | 2008-070985 A | 3/2008 |
| JP | 2013-069735 A | 4/2013 |
| JP | 2014-186052 A | 10/2014 |
| JP | 2014-232140 A | 12/2014 |

* cited by examiner

CONNECTOR UNIT, IMAGE FORMING APPARATUS, AND SHEET PROCESSING APPARATUS

This application is a continuation of application Ser. No. 17/665,336 filed Feb. 4, 2022, currently pending; and claims priority under 35 U.S.C. § 119 to Japan Application JP 2021-021683 filed in Japan on Feb. 15, 2021; and the contents of all of which are incorporated herein by reference as if set forth in full.

BACKGROUND OF THE INVENTION

Field of the Invention

The present invention relates to a connector unit for electrically connecting various electronic devices, an image forming apparatus such as a copying machine, a printer, a facsimile, or a multifunction device equipped with a plurality of these functions, and a sheet processing apparatus for performing postprocessing of recording materials.

Description of the Related Art

Hitherto, a mounting structure of a so-called panel mount system in which a connector for electrically connecting various electronic devices exposed to an exterior of a casing of the electronic device is used widely. As the mounting structure of the panel mount system, for example, a structure in which an elastically deformable hook portion provided on the connector is engaged with an edge portion of a mounting hole on the casing is applicable. By applying such a mounting structure of the panel mount system, a connector can be attached easily to the mounting hole on the casing.

However, when connecting a counterpart connector serving as the other connector to the connector mounted to the panel, for example, there were cases where the counterpart connector was pushed against the panel in a state where orientations or shapes of connectors were not compatible. In that case, there was a possibility that the connector mounted to the mounting hole was pushed forcibly. If the connector is pushed forcibly, the connector may be detached from the mounting hole and fall into the casing. If the connector mounted to the panel fell into the casing, for example, a cover of the casing must be opened to remove peripheral components of the connector, and the connector must be reattached to the mounting hole. Therefore, especially in a space where the image forming apparatus is installed for use by the user, there was a possibility that the workability may be deteriorated.

In order to solve this problem, a structure of providing a dedicated connector retaining member designed to cover three sides, which are a rear side, a top side and a bottom side, of a connector and having the connector retaining member retain the connector before mounting the connector retaining member to a mounting hole of a casing has been developed (refer to Japanese Patent Application Laid-Open Publication No. H02-46670).

According to the configuration disclosed in Japanese Patent Application Laid-Open Publication No. H02-46670 mentioned above, however, in a case where the counterpart connector is pushed in a state where the orientations or shapes of the connectors are not compatible, there was a risk that the connector retaining member itself was disengaged from the mounting hole of the casing. In that case, the connector retained by the connector retaining member also fell into the casing, and the connectors will not be able to be connected with each other. Therefore, a configuration capable of suppressing disengagement of the connector mounted to the panel is desired.

The present invention aims at providing a connector unit, an image forming apparatus, and a sheet processing apparatus that are capable of suppressing the connector mounted to a panel from falling into the casing.

SUMMARY OF THE INVENTION

According to a first aspect of the present invention, a connector unit includes a connector mounting member having a mounting hole, and a connector configured to be passed through the mounting hole and attached to the connector mounting member. The connector includes a terminal portion to which another connector is configured to be connected, and a hook portion engaged with an edge portion of the mounting hole. The connector mounting member includes a panel portion on which the mounting hole is formed, an extending portion extending from the panel portion along an inserting direction of the another connector with respect to the connector, and a regulating portion projected from the extending portion at a position abutting against or close to an end portion opposite to the terminal portion of the connector in the inserting direction. A distance between the regulating portion and the panel portion is shorter than a distance between the terminal portion of the connector and the end portion.

According to a second aspect of the present invention, a connector unit includes a connector mounting member having a substantially rectangular mounting hole, and a connector configured to be passed through the mounting hole and attached to the connector mounting member. The connector includes a terminal portion to which another connector is configured to be connected, and a plurality of hook portions engaged respectively with a pair of opposing edge portions among four edge portions of the mounting hole. The connector mounting member includes a panel portion on which the mounting hole is formed, and a protruded portion provided on an edge portion of the mounting hole other than the edge portion with which the plurality of hook portions are engaged, the protruded portion being projected to at least one of an upstream side and a downstream side of an inserting direction of the another connector with respect to the connector.

According to a third aspect of the present invention, a connector unit includes a connector mounting member having a mounting hole, and a connector configured to be passed through the mounting hole and attached to the connector mounting member. The connector includes a terminal portion to which another connector is configured to be connected, and a hook portion engaged with an edge portion of the mounting hole. The hook portion includes a first engaging surface, and a second engaging surface positioned downstream of the first engaging surface in an inserting direction of the another connector with respect to the connector and positioned on an inner side of the first engaging surface in a width direction intersecting the inserting direction. The connector mounting member includes a first engaged surface formed on an edge portion of the mounting hole with which the hook portion engages and engaged with the first engaging surface, and a second engaged surface positioned downstream of the first engaged surface in the inserting direction and positioned on the inner side of the first engaged surface in the width direction, the second engaged surface being engaged with the second engaging surface.

According to a fourth aspect of the present invention, an image forming apparatus includes an image forming unit configured to form an image on a recording material, and the connector unit according to claim 1.

According to a fifth aspect of the present invention, an image forming apparatus includes an image forming unit configured to form an image on a recording material, a casing accommodated the image forming unit, the connector unit according to claim 1, the connector unit being provided on the casing, and a storage portion provided below the casing in a vertical direction, the storage portion configured to accommodate a sheet to be supplied to the image forming unit, the storage portion including the another connector.

According to a sixth aspect of the present invention, a sheet processing apparatus includes a binding unit configured to perform a binding process to a recording material, and the connector unit according to claim 1.

According to a seventh aspect of the present invention, an image forming apparatus includes an image forming unit configured to form an image on a recording material, a casing configured to accommodate the image forming unit, a connector unit according to claim 6, the connector unit being provided on the casing, and a storage portion provided below the casing in a vertical direction, the storage portion being configured to accommodate a sheet to be supplied to the image forming unit, the storage portion including the another connector.

According to an eighth aspect of the present invention, an image forming apparatus includes an image forming unit configured to form an image on a recording material, a casing configured to accommodate the image forming unit, a connector unit according to claim 9, the connector unit being provided on the casing, and a storage portion provided below the casing in a vertical direction, the storage portion being configured to accommodate a sheet to be supplied to the image forming unit, the storage portion including the another connector.

Further features of the present invention will become apparent from the following description of exemplary embodiments with reference to the attached drawings.

DESCRIPTION OF THE EMBODIMENTS

First Embodiment

A first embodiment of the present disclosure will be described in detail with reference to FIGS. 1 to 11. The present embodiment illustrates a tandem-type full-color printer as an example of an image forming apparatus 1. However, the present disclosure is not limited to a tandem-type image forming apparatus 1, and it can be applied to other types of image forming apparatuses, or to a monochrome or mono-color printer instead of the full-color printer. Further, in the following description, the up, down, right, and left directions or positional relationships of front and rear sides are based on a state in which the image forming apparatus 1 is viewed from a front side, that is, based on a viewpoint of FIG. 1.

Image Forming Apparatus

Figure 1:
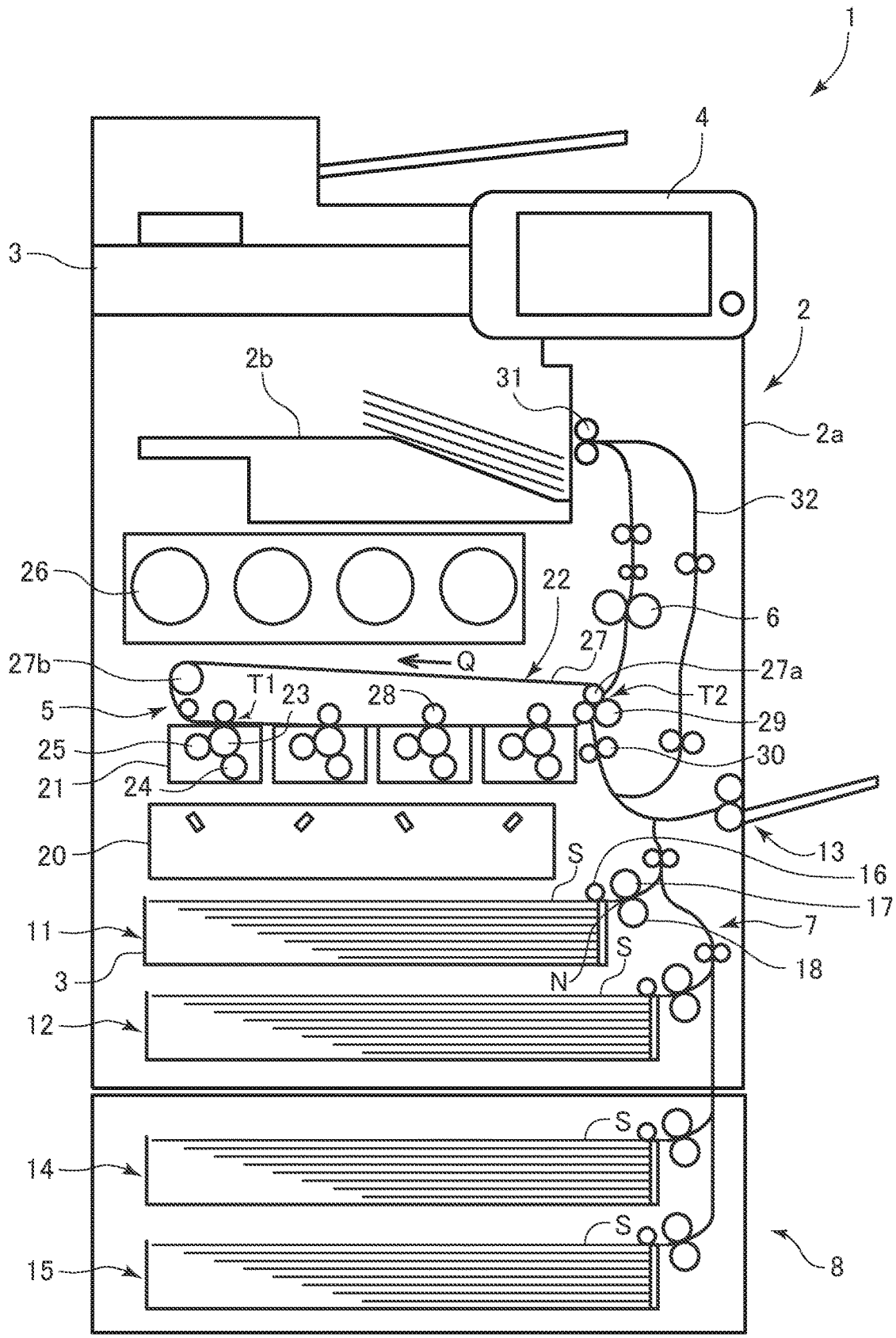
FIG. 1 is a cross-sectional view illustrating a general configuration of an image forming apparatus according to a first embodiment.

The image forming apparatus 1 includes, as illustrated in FIG. 1, an apparatus body 2 which is an example of an image forming apparatus body capable of forming an image, a reading unit 3 provided above the apparatus body 2 for reading an image data from a document, and an operation portion 4 composed of a liquid crystal panel. The apparatus body 2 includes an image forming portion 5 which is an example of an image forming unit capable of forming an image on a sheet S which is an example of a recording material, and a fixing portion 6 for fixing an image on the sheet S. The image forming portion 5 and the fixing portion 6 are accommodated in a casing 2a of the apparatus body 2. A sheet discharge space to which the sheet S is discharged is formed between the reading unit 3 and the apparatus body 2, and a sheet discharge tray 2b for supporting the sheet S being discharged is provided in the sheet discharge space.

A sheet feeding unit 7 for feeding the sheet S to the image forming portion 5 is provided in the apparatus body 2. The sheet feeding unit 7 includes sheet cassettes 11 and 12 arranged at a lower part of the apparatus body 2, and a manual sheet feed apparatus 13 arranged on a right-side portion of the apparatus body 2. Further, according to the present embodiment, an external sheet cassette apparatus 8, i.e., cassette pedestal, serving as an example of another apparatus to be connected to the apparatus body 2 is attached as an extension option to a lower side of the apparatus body 2. The sheet cassette apparatus 8 includes sheet cassettes 14 and 15. That is, the sheet cassette apparatus 8 is an example of a storage portion storing the sheets S to be supplied to the image forming portion 5, arranged below the casing 2a in the vertical direction. The apparatus body 2 and the sheet cassette apparatus 8 are connected via a connector unit 40 (refer to FIG. 3). A detailed configuration of the connector unit 40 will be described below.

The apparatus body 2 includes a pickup roller 16 that abuts against the sheet S supported on a sheet cassette 11 and capable of conveying and feeding the sheet S, and a feed roller 17 that conveys the sheet S fed by the pickup roller 16. Further, the apparatus body 2 includes a retard roller 18 that forms a separation nip N with the feed roller 17 and separates the sheets S one at a time. Other sheet cassettes 12, 14, and 15 are configured similarly. The image forming portion 5 forms an image on the sheet S fed from the sheet cassettes 11, 12, 14, and 15.

The image forming portion 5 is a four drum full-color image forming portion equipped with a laser scanner 20, four process cartridges 21, and an intermediate transfer unit 22. These process cartridges form toner images of respective colors, which are yellow (Y), magenta (M), cyan (C), and black (K). Each process cartridge 21 is equipped with a photosensitive drum 23, a charging unit 24, a developing unit 25, and a cleaner not shown. Toner cartridges 26 respectively storing corresponding color toner are attached detachably to the apparatus body 2 above the image forming portion 5.

The intermediate transfer unit 22 includes an intermediate transfer belt 27 wound around a driving roller 27a and a tension roller 27b, and the intermediate transfer belt 27 is arranged above the four process cartridges 21. The intermediate transfer belt 27 is arranged to be in contact with the photosensitive drums 23 of the respective process cartridges 21 and driven to rotate in a counterclockwise direction (direction of arrow Q) by the driving roller 27a driven by a driving unit not shown. The intermediate transfer unit 22 is equipped with primary transfer rollers 28 that abut against an inner circumferential surface of the intermediate transfer belt 27 at positions opposed to the respective photosensitive drums 23, and primary transfer portions T1 are formed as nip portions between the intermediate transfer belt 27 and the photosensitive drums 23. Further, the image forming portion 5 includes a secondary transfer roller 29 that abuts against an outer circumferential surface of the intermediate transfer belt 27 at a position opposed to the driving roller 27a. A secondary transfer portion T2 at which a toner image borne on the intermediate transfer belt 27 is transferred to the sheet S is formed as a nip portion between the secondary transfer roller 29 and the intermediate transfer belt 27.

In the respective process cartridges 21 configured as above, after electrostatic latent images are formed by the laser scanner 20 to the surface of the photosensitive drums 23, toner is supplied from the developing unit 25, by which toner images of respective colors charged to negative polarity are formed. By having a transfer bias voltage of positive polarity applied to the primary transfer rollers 28, the toner images are sequentially subjected to multiple transfer, i.e., primary transfer, to the intermediate transfer belt 27 at each of the primary transfer portions T1, and a full-color toner image is formed on the intermediate transfer belt 27.

In parallel with such toner image forming process, the sheet S fed from the sheet feeding unit 7 is conveyed toward a registration roller pair 30, and the sheet S is subjected to skew correction by the registration roller pair 30. The registration roller pair 30 conveys the sheet S to the secondary transfer portion T2 at a matched timing with a transfer timing of the full-color toner image formed on the intermediate transfer belt 27. By having a transfer bias voltage of positive polarity applied to the secondary transfer roller 29, the toner image borne on the intermediate transfer belt 27 is secondarily transferred to the sheet S at the secondary transfer portion T2.

The sheet S to which the toner image has been transferred is heated and pressed at the fixing portion 6, and a color image is fixed to the sheet S. The sheet S having the image fixed thereto is discharged by a sheet discharge roller pair 31 and supported on the sheet discharge tray 2b. When forming images on both sides of the sheet S, the sheet S is subjected to switch-back by the sheet discharge roller pair 31 after passing the fixing portion 6. Then, the sheet S is conveyed again to the image forming portion 5 through a re-conveyance path 32, and an image is formed on a rear side of the sheet S.

Connector Unit

Figure 2A:
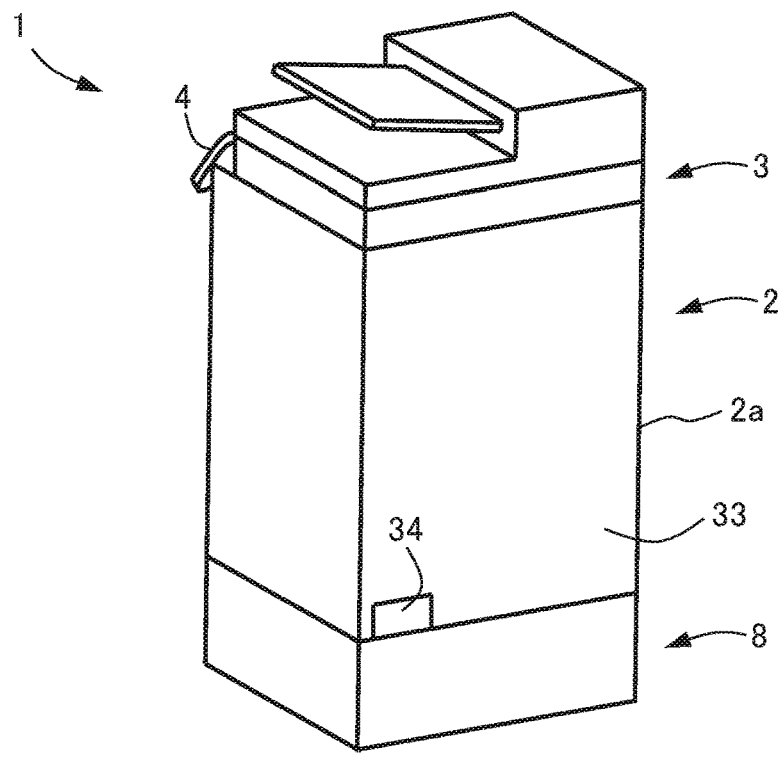
FIG. 2A is a perspective view of the image forming apparatus according to the first embodiment illustrated from a rear side with a small cover closed.
Figure 2B:
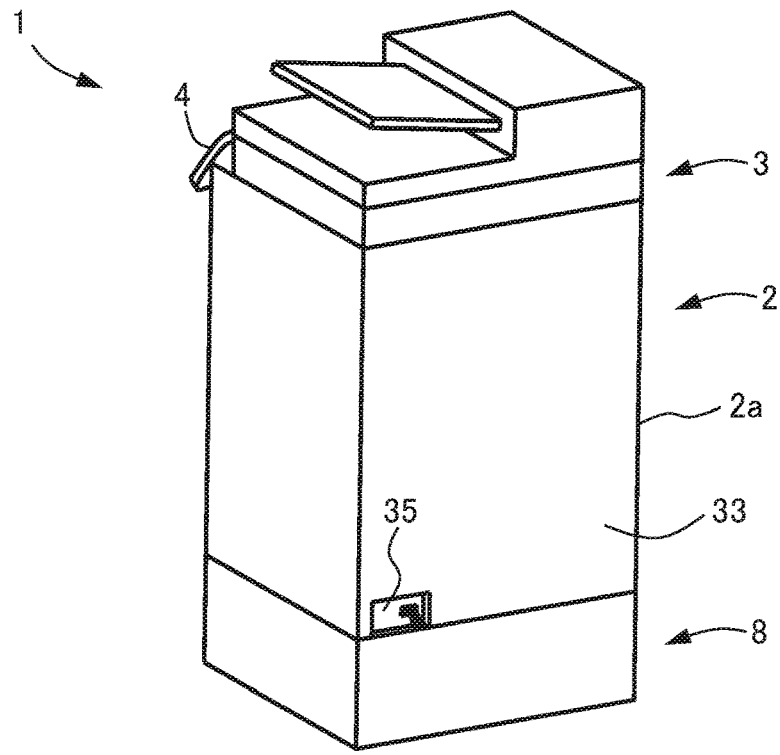
FIG. 2B is a perspective view of the image forming apparatus according to the first embodiment illustrated from the rear side with the small cover opened.

Next, the connector unit 40 according to the present embodiment will be described in detail with reference to FIGS. 2A to 11. At first, an installation position of the connector unit 40 according to the present embodiment will be described with reference to FIGS. 2A, 2B, and 3. FIG. 2A is a perspective rear view of the image forming apparatus 1. The image forming apparatus 1 is in a state where the sheet cassette apparatus 8 is attached as an optional apparatus. The apparatus body 2 includes a rear cover 33, and a small cover 34 formed at a lower part of the rear cover 33 and opened when attaching the sheet cassette apparatus 8. FIG. 2B illustrates a state where the small cover 34 is removed. When the small cover 34 is removed, a recess portion 35 that is provided in a concaved manner from the rear cover 33 is exposed.

Figure 3:
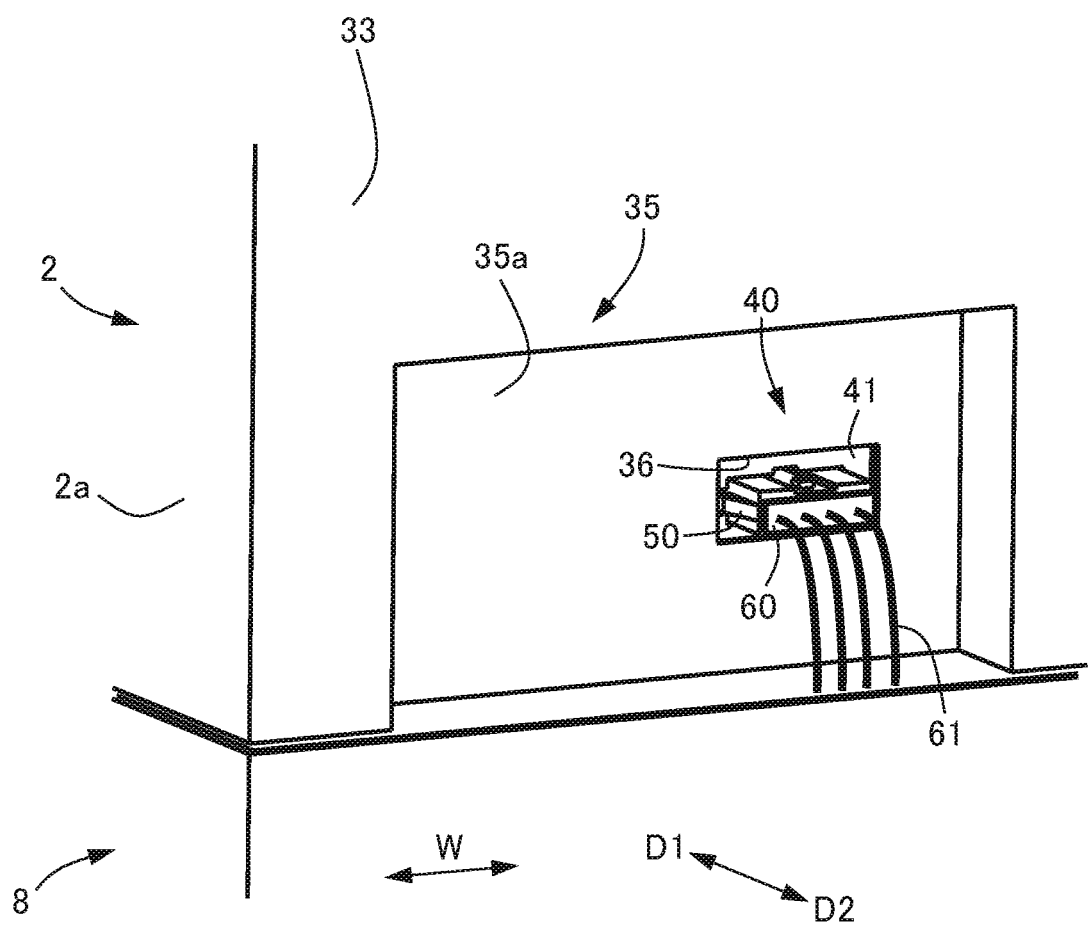
FIG. 3 is an enlarged perspective view of a recess portion of the image forming apparatus according to the first embodiment.

FIG. 3 is an enlarged view of the recess portion 35. A rectangular hole 36 is formed at a part of a bottom surface 35a of the recess portion 35. The connector unit 40 is provided on an inner side of the apparatus body 2 of the rectangular hole 36. A connector 50 retained on the connector mounting member 41 of the connector unit 40 is projected from the rectangular hole 36. A counterpart connector 60 which is an example of another connector disposed at a leading edge of a bundle wire 61 exposed from the sheet cassette apparatus 8 to an exterior of the casing is inserted and connected to the connector 50. An end portion opposite to the counterpart connector 60 of the bundle wire 61 is connected to an electric board not shown provided on an inner side of the sheet cassette apparatus 8. The apparatus body 2 and the optional sheet cassette apparatus 8 are electrically connected by the connection between the connector 50 of the apparatus body 2 and the counterpart connector 60 of the sheet cassette apparatus 8. Since the sheet cassette apparatus 8 is an optional apparatus, an operation to connect the apparatus body 2 and the sheet cassette apparatus 8 is performed when the image forming apparatus 1 is installed at the user site.

Figure 4A:
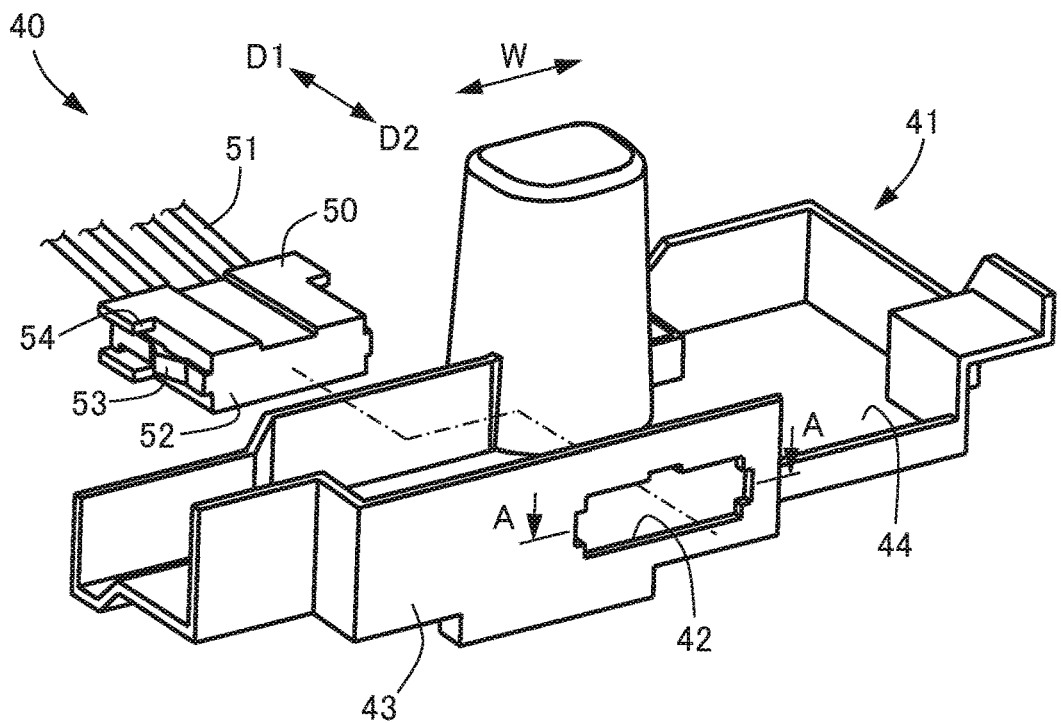
FIG. 4A is a perspective view of a connector unit according to the first embodiment, illustrating a state before attaching a connector.
Figure 4B:
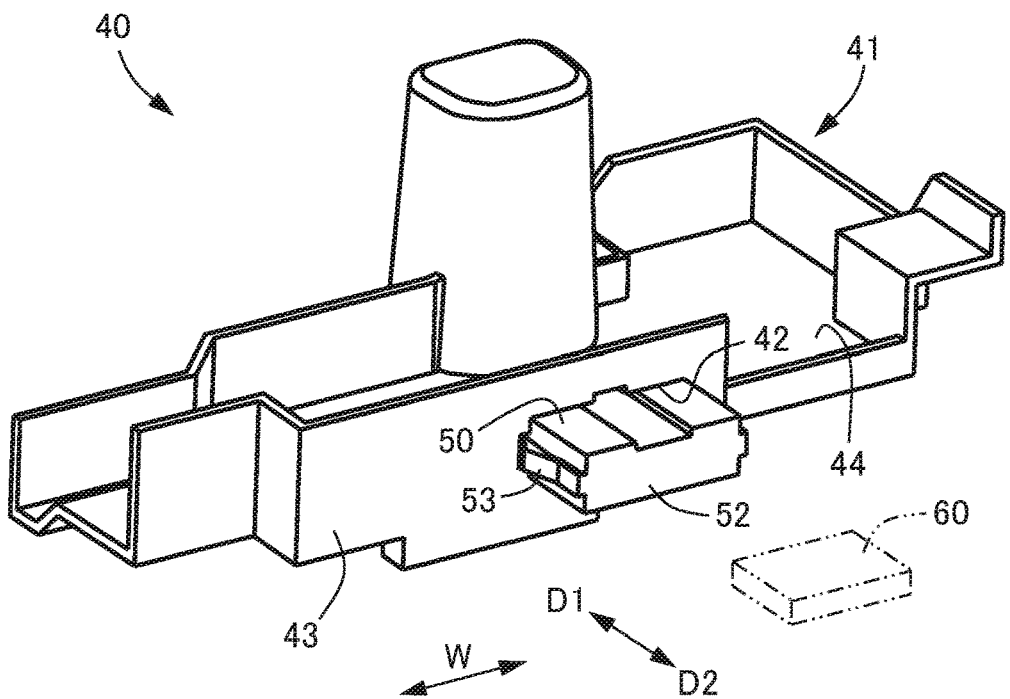
FIG. 4B is a perspective view of a connector unit according to the first embodiment, illustrating a state after attaching the connector.

Next, a general configuration of the connector unit 40 will be described with reference to FIGS. 4A and 4B. FIG. 4A is a perspective view illustrating the connector mounting member 41 in a state where the rear cover 33 is removed and before the connector 50 is mounted. FIG. 4B is a perspective view of the connector mounting member 41 in a state where the connector 50 is mounted. The connector unit 40 includes the connector 50 and the connector mounting member 41 to which the connector 50 is mounted. The connector mounting member 41 is made of synthetic resin and functions as a bundle wire guide for guiding a bundle wire 51 of the connector 50. In the present embodiment, as illustrated in FIG. 4B, a direction in which the counterpart connector 60 is inserted and connected to the connector 50 of the connector unit 40 is referred to as an inserting direction D1. Further, a direction intersecting the inserting direction D1, which according to the present embodiment is a direction orthogonal to the inserting direction D1 on a horizontal plane, is referred to as a width direction W.

The connector mounting member 41 includes a panel portion 43 on which is formed a mounting hole 42 to which the connector 50 is inserted and mounted, and an extending portion 44 which is formed integrally and extends from the panel portion 43 to the inserting direction D1. The mounting hole 42 is exposed to an exterior through the rectangular hole 36 formed on the bottom surface 35a of the recess portion 35 (refer to FIG. 3). Further, the mounting hole 42 is substantially rectangular, and formed along a contour of the connector 50, as illustrated in FIG. 4A.

The bundle wire 51 is integrally disposed on the inserting direction D1 side, that is, inserting direction side, of the connector 50. An opening 52, which is an example of a terminal portion engageable in an attachable and detachable manner with the counterpart connector 60, is provided at an end portion opposite to the inserting direction D1 of the connector 50. Terminal pins not shown are provided at an inner side of the opening 52, and the terminal pins are to be connected to terminal pins not shown of the counterpart connector 60. Hook portions 53 and abutting portions 54 are provided at both sides in a width direction of the connector 50 intersecting the inserting direction D1. The hook portions 53 are provided in a manner elastically deformable to an inner direction of the connector 50. The connector 50 is mounted to the connector mounting member 41 by being inserted to the mounting hole 42 of the connector mounting member 41 in an attaching direction D2 which is opposite to the inserting direction D1. In the present embodiment, the opening 52 is applied as the terminal portion, but the present disclosure is not limited thereto, and the terminal portion can be any shape engageable with the counterpart connector 60, and for example, a terminal portion of an existing connector which adopts a projected shape including terminal pins can be adopted.

Figure 5:
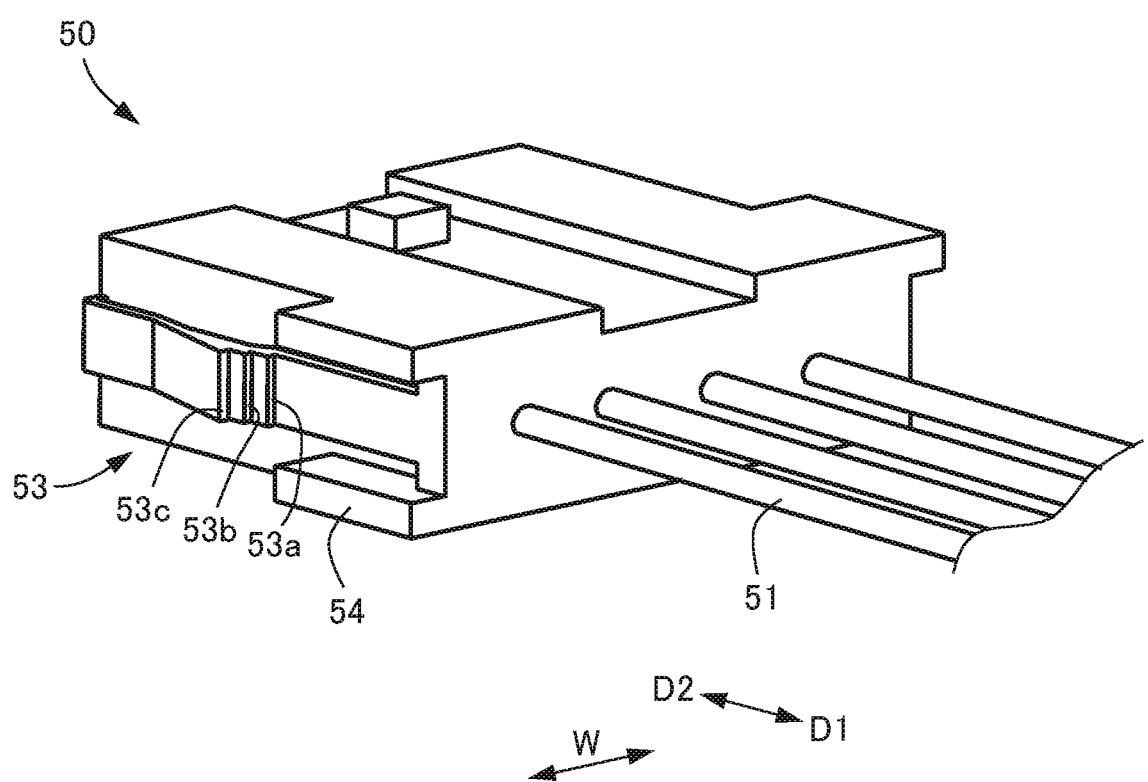
FIG. 5 is a perspective view of the connector according to the first embodiment.

Next, the configuration of the hook portions 53 and the abutting portions 54 will be described with reference to FIGS. 5, 6A, and 6B. FIG. 5 is a perspective view illustrating the connector 50 from the bundle wire 51 side. Engaging surfaces 53a, 53b, and 53c facing the inserting direction D1 are provided to the hook portions 53. Since a plurality of the engaging surfaces 53a, 53b, and 53c are provided, even in a case where a plate thickness of the panel portion 43 to which the mounting hole 42 is provided differs, engagement can be realized by having different combinations of engaging surfaces 53a, 53b, and 53c corresponding to the plate thickness engage with the panel portion 43.

Figure 6A:
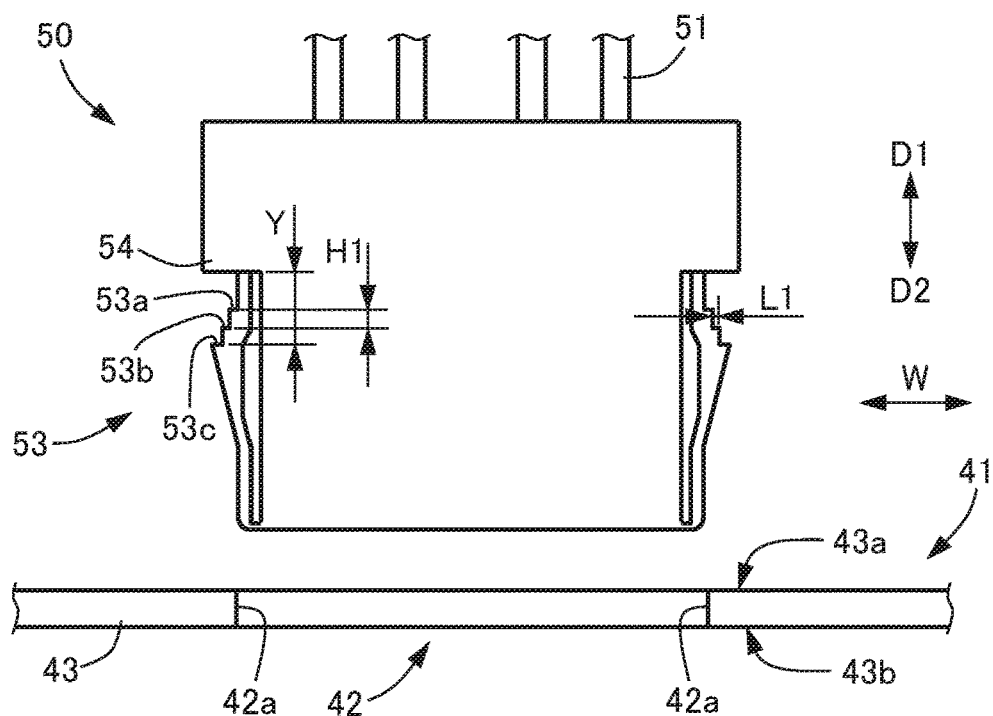
FIG. 6A is a cross-sectional view of the connector unit according to the first embodiment, illustrating a state before attaching the connector.
Figure 6B:
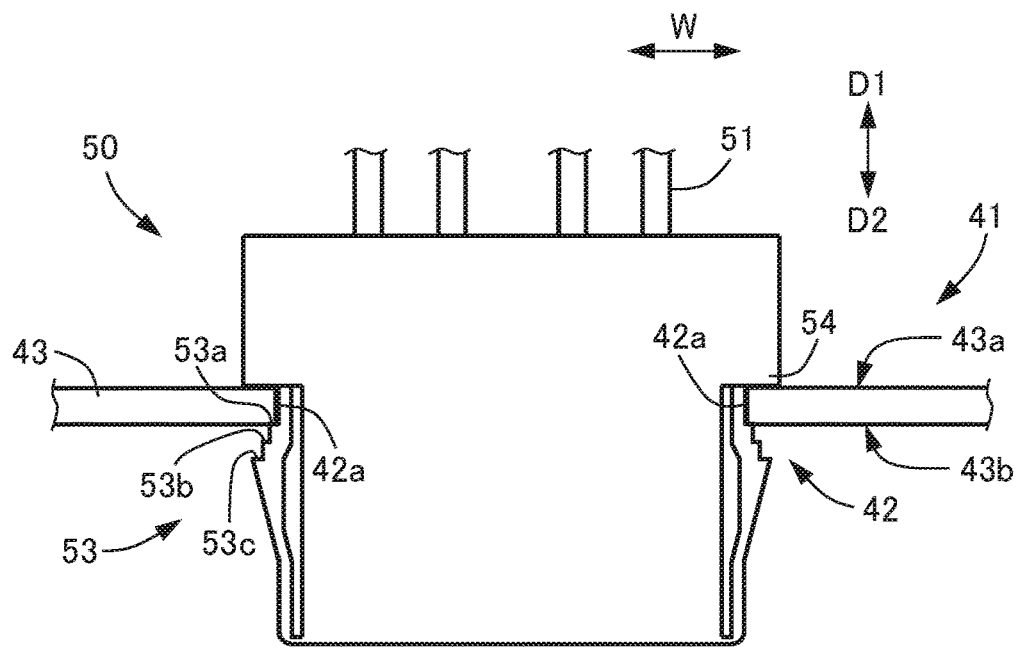
FIG. 6B is a cross-sectional view of the connector unit according to the first embodiment, illustrating a state after attaching the connector.

FIGS. 6A and 6B are cross-sectional views illustrating a state in which the mounting hole 42 is cut at line A-A of FIG. 4A, wherein FIG. 6A illustrates a state before mounting the connector 50, and FIG. 6B illustrates a state after mounting the connector 50. The connector 50 is inserted to the mounting hole 42 in the attaching direction D2 of FIG. 6A. According to the present embodiment, a length L1 (refer to FIG. 6A) in the width direction W of each of the engaging surfaces 53a, 53b, and 53c is 0.3 mm. Further, a height H1 (refer to FIG. 6A) in the inserting direction D1 between adjacent engaging surfaces 53a, 53b, and 53c is 0.4 mm. In the present embodiment, a maximum length of an engaging area in the inserting direction D1 at which the hook portions 53 can engage with the mounting hole 42 is referred to as length Y.

In the process of inserting the connector 50 to the mounting hole 42, the hook portions 53 come into contact with side edge portions 42a, which are examples of the edge portions, and the hook portions 53 elastically deform toward a center side of the connector 50. In that state, if the connector 50 is pushed toward the attaching direction D2, the abutting portions 54 of the connector 50 come to abut against an inner side surface 43a of the connector mounting member 41 of the panel portion 43. In this state, the elastically deformed hook portions 53 return, and engaging surfaces 53a of the hook portions 53 are hooked on and engages with an outer side surface 43b of the panel portion 43 of the connector mounting member 41, so that the connector is retained without falling. In a state where the plate thickness of the connector mounting member 41 is thick, engaging surfaces 53b or engaging surfaces 53c are hooked instead of the engaging surfaces 53a, by which the connector 50 is retained on the connector mounting member 41. That is, in the connector unit 40, the connector 50 is mounted to the mounting hole 42 by having the hook portions 53 engage with the side edge portions 42a of the mounting hole 42.

Figure 7:
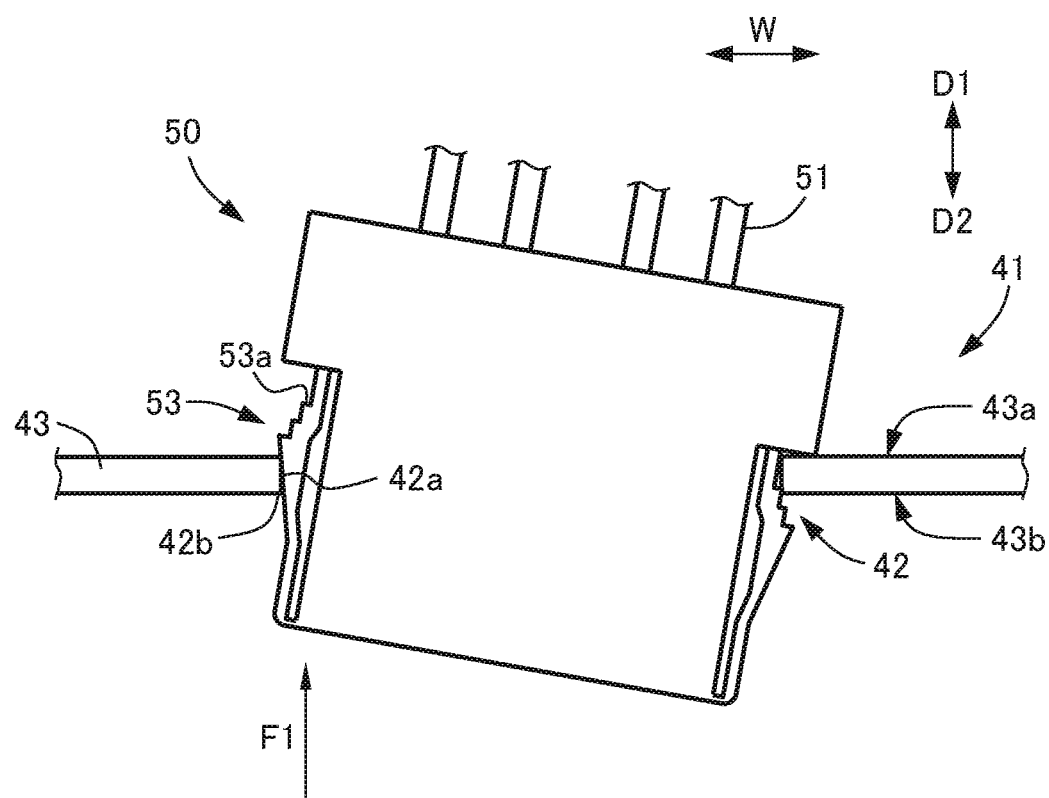
FIG. 7 is a cross-sectional view of a connector unit according to a reference example, illustrating a state where the connector has received external force and a hook portion has been disengaged.

Now, a reference example of a case where the connector 50 retained by the connector mounting member 41 is detached unintentionally will be described with reference to FIG. 7. FIG. 7 is a cross-sectional view illustrating the mounting hole 42 cut at line A-A of FIG. 4A. For example, according to a case in which the engaging surfaces 53a are engaged with the outer side surface 43b of the panel portion 43, as illustrated in FIG. 6B, there is a possibility that an external force F1 in the inserting direction D1 is excessively applied specifically to only one side in the width direction W of the connector 50, as illustrated in FIG. 7. In that case, the external force F1 cannot be received by the engaging surfaces 53a and deformation is caused, and finally, distortion of the engaging surfaces 53a occurs and the connector 50 itself may fall from the connector mounting member 41.

Further, the connector mounting member 41 is made of synthetic resin, and a rounded shape may be formed on an edge portion 42b of the mounting hole 42. In that case, the engaging surface 53a of the connector 50 may be caught at the edge portion 42b having the rounded shape, and if the external force F1 in the inserting direction D1 is applied in that state, the engaging surface 53a may slip from the edge portion 42b to the inserting direction D1, causing the connector 50 to fall.

For example, if the panel portion 43 is made of metal and the mounting hole 42 is formed by punching, punching burrs that may be formed at the side edge portions 42a may wedge into the engaging surfaces 53a of the connector 50, preventing the connector 50 from falling easily. However, due to the recent demand for lower costs, the panel portion 43 is often made of synthetic resin, so there is a demand for preventing the connector 50 from easily falling even if the panel portion 43 is made of synthetic resin.

Further, if the connector 50 mounted to the panel is specifically a connector for connection with an optional apparatus, the connecting operation is often performed at the user's site of use of the image forming apparatus 1, and it may be possible that an unspecified number of people may perform the operation, unlike the operation performed at a factory. In that case, the connector may be pushed in with excessive force or may collide against something, by which the connector 50 is disengaged from the connector mounting member 41 and fall into the apparatus body 2. When the connector 50 falls into the apparatus body 2, an external cover of the apparatus and peripheral components of the connector 50 must be detached for repairing, which is difficult to realize at the installation site, so that it is desirable to prevent falling of the connector 50 reliably.

Figure 8A:
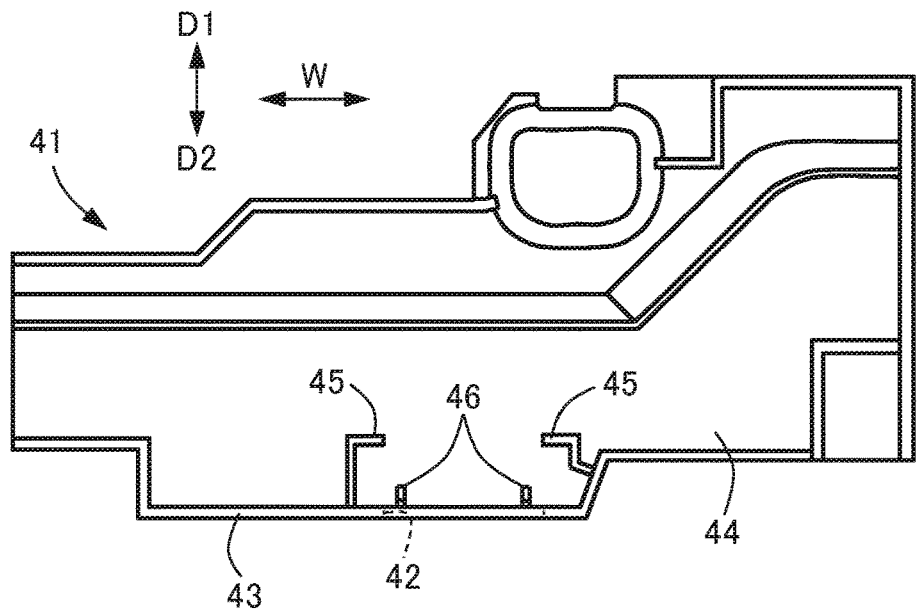
FIG. 8A is a plan view of a connector mounting member according to the first embodiment, illustrating a state before mounting the connector.
Figure 8B:
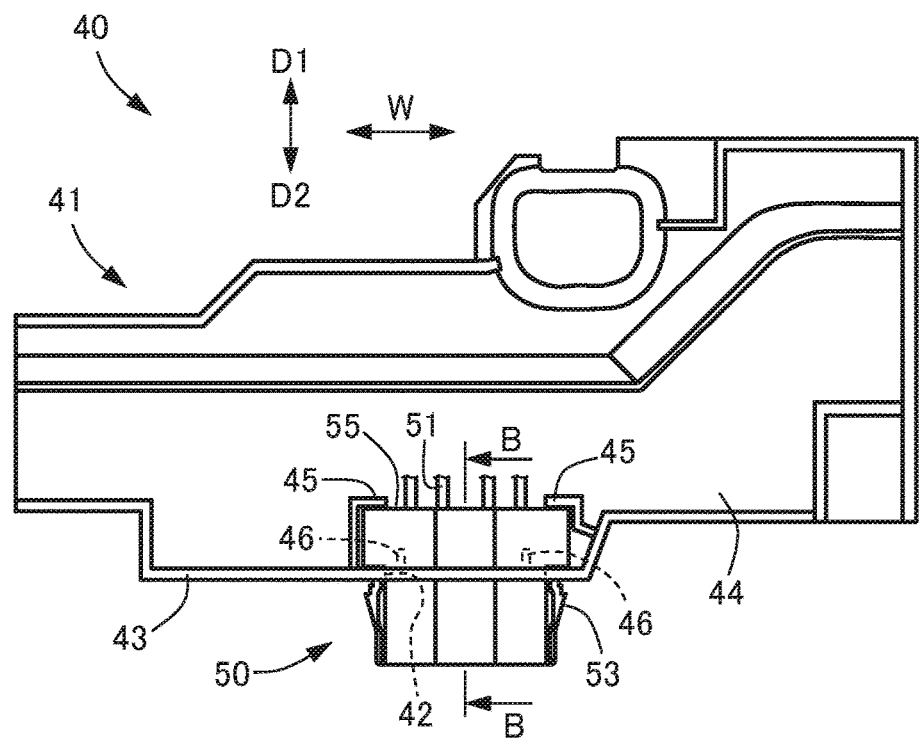
FIG. 8B is a plan view of the connector mounting member according to the first embodiment, illustrating a state after mounting the connector.
Figure 9:
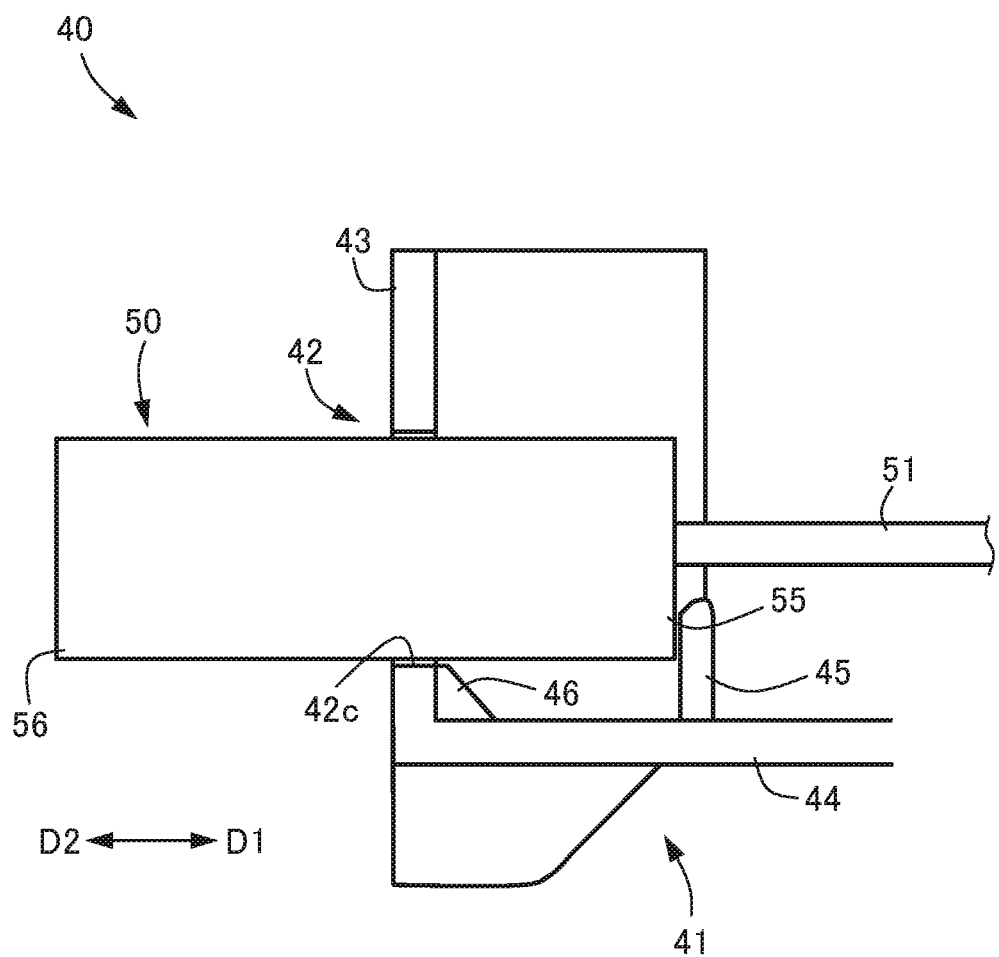
FIG. 9 is a cross-sectional view illustrating the connector unit according to the first embodiment.
Figure 10:
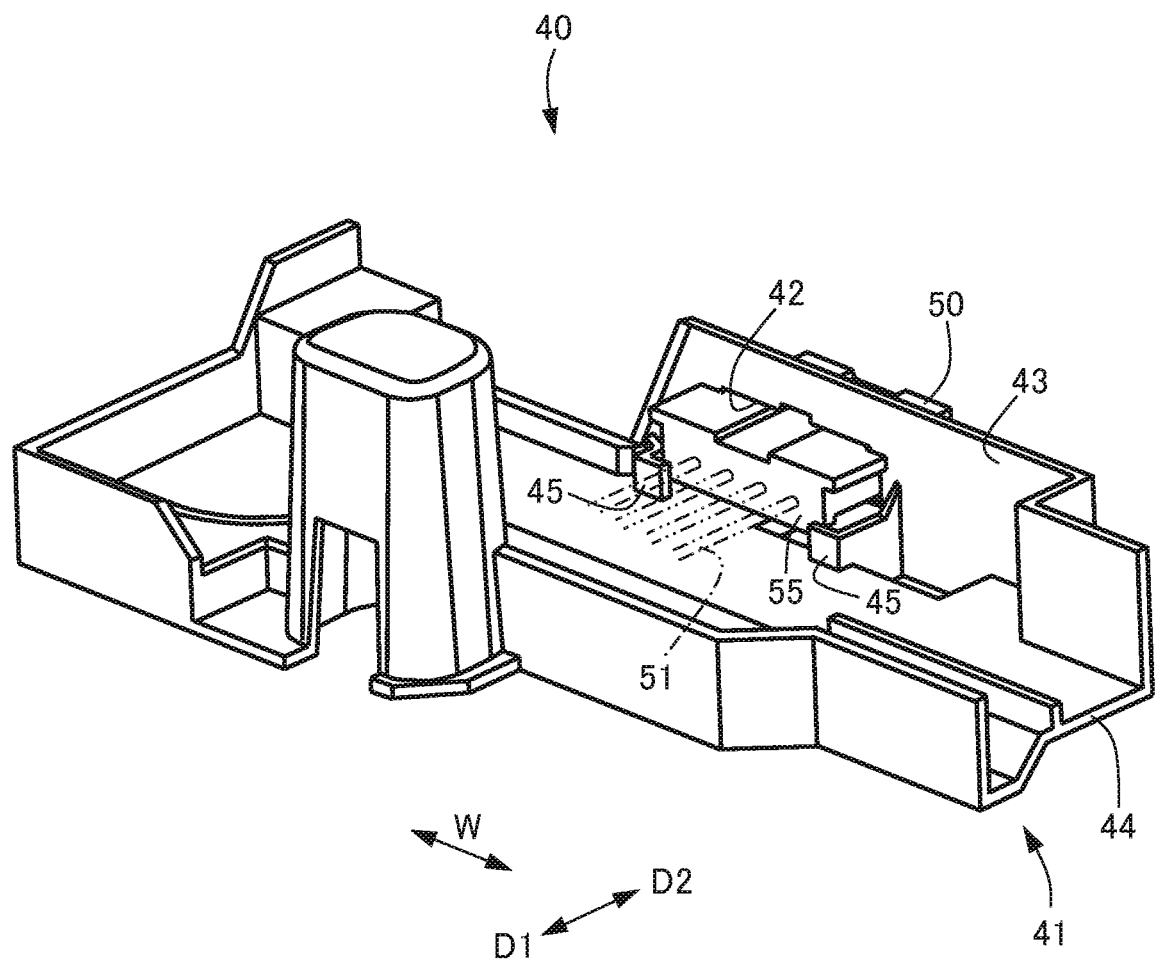
FIG. 10 is a perspective view of the connector unit according to the first embodiment illustrated from a bundle wire-side.

Next, a characteristic configuration of the connector unit 40 according to the present embodiment will be described with reference to FIGS. 8A and 8B to FIG. 11. FIGS. 8A and 8B are plan views illustrating the connector mounting member 41, wherein FIG. 8A illustrates a state before mounting the connector 50 and FIG. 8B illustrates a state after mounting the connector 50. FIG. 9 is a cross-sectional view illustrating a state where the connector unit 40 is cut at line B-B of FIG. 8B, and FIG. 10 is a perspective view of the connector unit 40 taken from the bundle wire 51 side.

The regulating portions 45 formed to project upward in the shape of ribs are provided on the extending portion 44 of the connector mounting member 41. The regulating portions 45 are provided integrally with the extending portion 44 at a vicinity of an end portion 55 of the connector 50 on the bundle wire 51 side in the state mounted to the mounting hole 42. In the present embodiment, the distance between the regulating portions 45 and the end portion 55 is 0.5 mm, but the distance is not limited thereto. The distance between the regulating portions 45 and the end portions 55 can be longer than 0.5 mm, or can be shorter than 0.5 mm, and it can be 0.2 mm or more and 1.0 mm or less, or the regulating portions 45 and the end portion 55 can even abut against each other without a gap. In other words, the regulating portions 45 are integrally provided on the extending portion 44 so as to oppose to the parts of the connector 50 facing the inserting direction D1, that is, the end portion 55, in the attaching direction D2 in a manner abutting against or close to the connector 50. Further, a distance from the regulating portions 45 to the panel portion 43 on which the mounting hole 42 is formed in the attaching direction D2 is shorter than a distance from the end portion 55 of the connector 50 on the bundle wire 51 side to an end portion on the opening 52 side. In the illustrated example, the regulating portions 45 according to the present embodiment are integrally molded as the connector mounting member 41 with the extending portion 44, but alternatively, they can be fixed integrally to the extending portion 44 by an adhesive. As described, since the regulating portions 45 are provided, the end portion 55 of the connector 50 will abut against the regulating portions 45 when the connector 50 is pushed toward the inserting direction D1 and the hook portions 53 of the connector 50 are detached from the panel portion 43. Therefore, falling of the connector 50 can be prevented.

In the present embodiment, an upper end position of the regulating portions 45 is lower than an upper part of the mounting hole 42 formed on the panel portion 43 in a state where the connector 50 is mounted to the mounting hole 42. In further detail, the position of the upper end of the regulating portions 45 is set to be lower than the bundle wire 51 in a state where the connector 50 is mounted to the mounting hole 42. When viewed in the inserting direction D1, the regulating portions 45 are formed to project from the extending portion 44 so that the height of the regulating portions 45 from the extending portion 44 is lower than the center point of the mounting hole 42, that is, does not exceed the center point of the mounting hole 42. Therefore, it becomes possible to suppress the regulating portions 45 from interfering with the bundle wire 51. Further, the height of the regulating portions 45 is set higher than a lower surface 42c (refer to FIG. 9) of the mounting hole 42, which is set to a height of 2.5 mm above the lower surface 42c of the mounting hole 42 in the example. Therefore, when the end portion 55 of the connector 50 attached to the mounting hole 42 is pushed in the inserting direction D1, the end portion 55 will abut against the regulating portions 45 reliably. In the present embodiment, the center point of the mounting hole 42 is a point at which the diagonal lines of the substantially rectangular mounting hole 42 cross each other. In the present embodiment, the upper end of the regulating portions 45 is set to be at a position lower than the bundle wire 51 of the connector 50, but the position is not limited thereto, as long as the regulating portions 45 do not interfere with the bundle wire 51. For example, if the bundle wire 51 and the regulating portions 45 satisfy a non-interfering positional relationship in an arrow W direction illustrated in FIG. 10, the upper end of the regulating portions 45 can be positioned higher than the bundle wire 51.

Further, as illustrated in FIG. 9, the connector mounting member 41 includes an inclined rib 46 provided to incline from the lower surface 42c toward the extending portion 44 at the inserting direction D1 side of the mounting hole 42. That is, the inclined rib 46 is provided to be inclined from the extending portion 44 toward the lower end of the mounting hole 42. The inclined rib 46 is provided integrally with the panel portion 43 and the extending portion 44.

Figure 11:
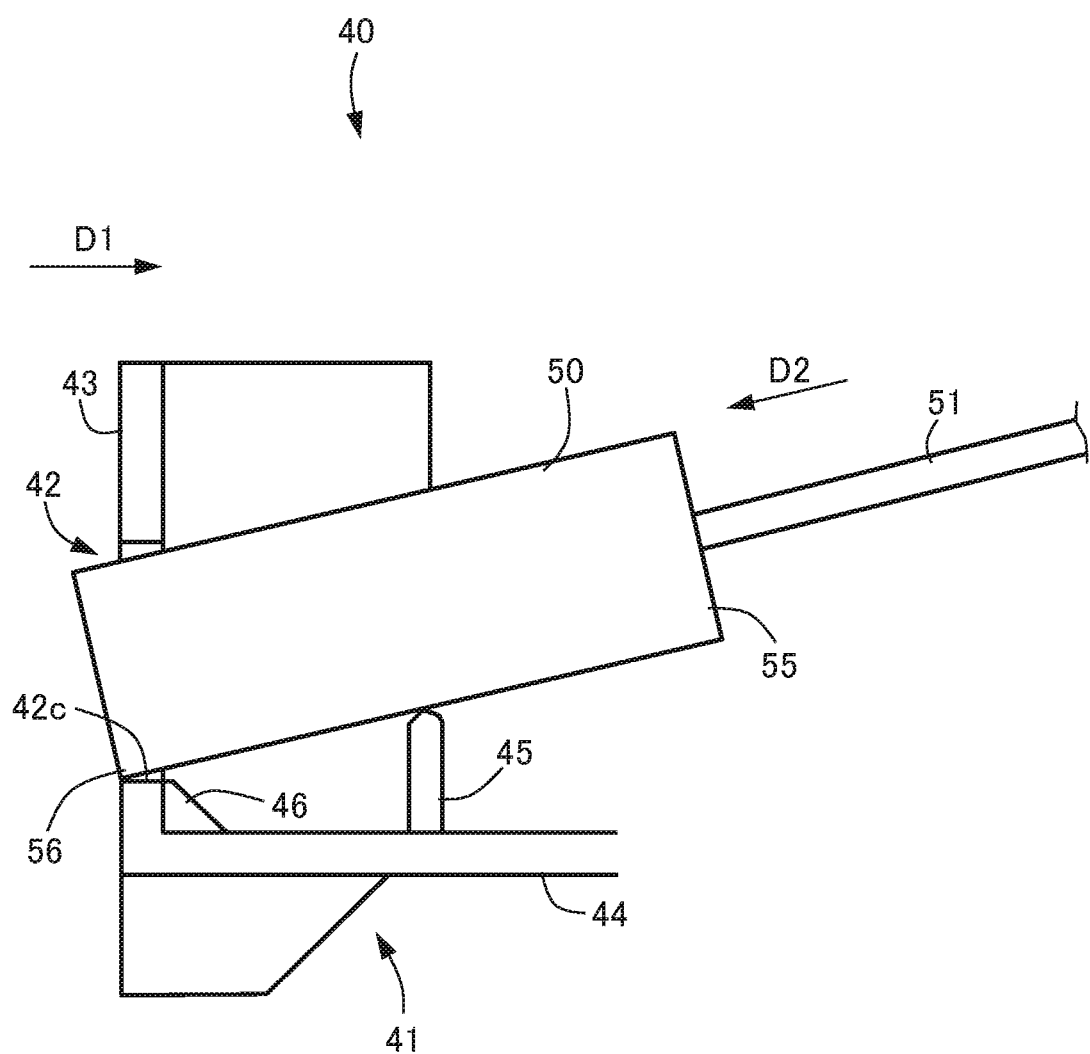
FIG. 11 is a cross-sectional view of the connector unit according to the first embodiment, illustrating a state where the connector is being inserted.

Now, a process for assembling the connector 50 to the connector mounting member 41 will be described with reference to FIGS. 9 and 11. As illustrated in FIG. 11, in a state where the connector 50 is inserted to the mounting hole 42, the connector 50 is approached toward the mounting hole 42 with the attaching direction D2 tilted with respect to the inserting direction D1 to avoid the regulating portions 45. In this state, the inclined rib 46 guides a leading-edge portion 56 on a lower side in the attaching direction D2 of the connector 50 to the mounting hole 42. Thus, since the inclined rib 46 is provided, the connector 50 can be guided to the lower surface 42c of the mounting hole 42 by simply moving the leading-edge portion 56 of the connector 50 along the inclined rib 46, and the workability for mounting the connector 50 to the mounting hole 42 in an inclined orientation is improved. Then, after the whole body of the connector 50 including the end portion 55 has passed the regulating portions 45, the connector 50 is attached to the mounting hole 42 as illustrated in FIG. 9 by changing the direction of the attaching direction D2 to a direction along the inserting direction D1.

As described, according to the connector unit 40 of the present embodiment, the connector mounting member 41 includes the regulating portions 45, so that even if the connector 50 is pushed in the inserting direction D1 and the hook portions 53 of the connector 50 are disengaged, the end portion 55 of the connector 50 will abut against the regulating portions 45. Therefore, in a state where the counterpart connector 60 is pushed toward the connector 50 in a state where the orientations or shapes of the connectors are not compatible, it becomes possible to suppress the occurrence of the connector 50 being disengaged from the mounting hole 42 and falling into the casing 2a. As described, a fall prevention structure capable of preventing the connector 50 from falling into the apparatus body 2 can be realized. Further, since the fall prevention structure can be obtained by a simple configuration without increasing the number of components, it can be realized at a low cost.

Second Embodiment

Next, a second embodiment of the present invention will be described in detail with reference to FIGS. 12 and 13. The configuration of a connector unit 140 according to the present embodiment differs from the configuration of the first embodiment in that a regulating portion 145 of a connector mounting member 141 is supported by an elastic portion 147. The other configurations are similar to the first embodiment, so that they are assigned with the same reference numerals, and detailed descriptions thereof are omitted.

Figure 12:
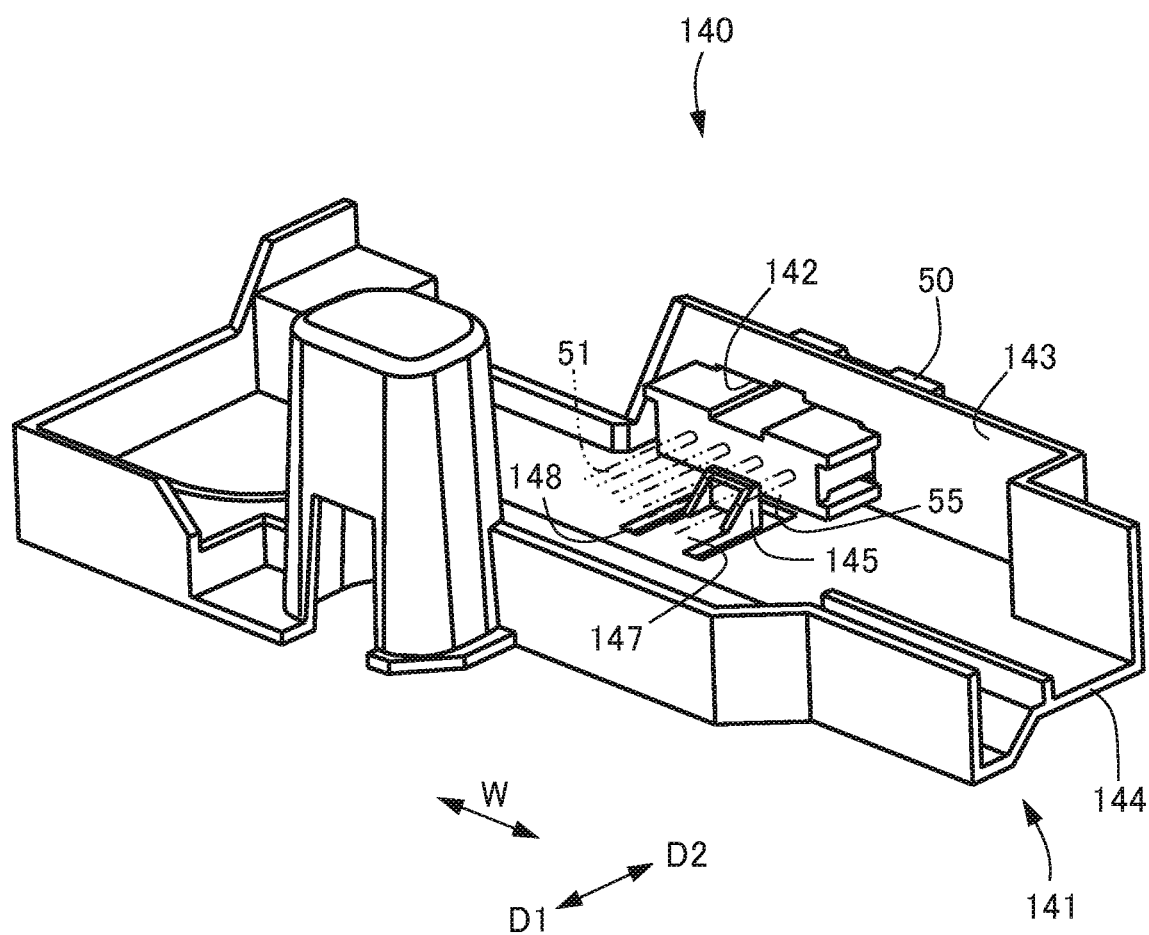
FIG. 12 is a perspective view of a connector unit according to a second embodiment illustrated from a bundle wire-side.
Figure 13:
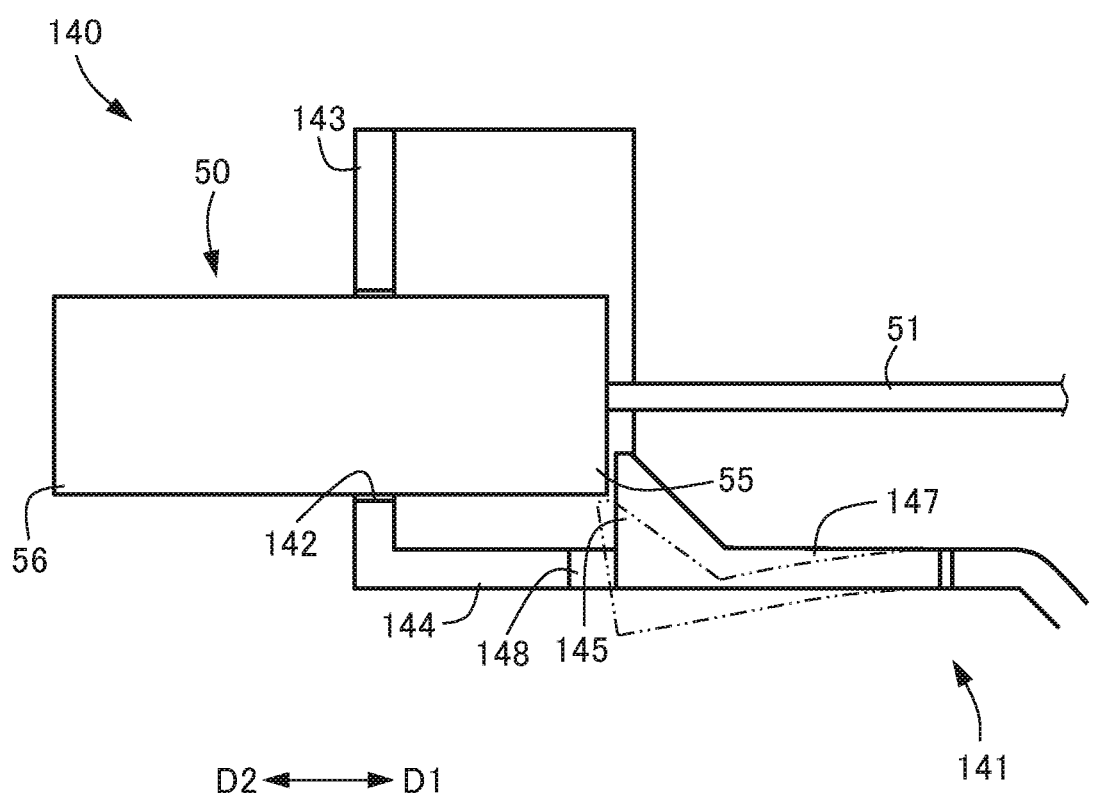
FIG. 13 is a cross-sectional view of the connector unit according to the second embodiment.

In the present embodiment, as illustrated in FIGS. 12 and 13, the connector mounting member 141 includes a panel portion 143, a mounting hole 142 formed on the panel portion 143, and an extending portion 144. The extending portion 144 includes the elastic portion 147 that is elastically deformable in a vertical direction perpendicular to the inserting direction D1 and provided toward the inserting direction D1 side than the mounting hole 142. The elastic portion 147 is provided elastically deformably in a direction close to and away from the mounting hole 142 when viewed in the inserting direction D1. In the present embodiment, the elastic portion 147 is formed by a part in the shape of a cantilever surrounded by a substantially U-shaped notch groove 148 provided at a portion of the extending portion 144. The elastic portion 147 is formed so that the attaching direction D2 side is a free end.

The regulating portion 145 is integrated with an end portion of the elastic portion 147 in the attaching direction D2 side and formed to project upward. The elastic portion 147 is provided elastically deformably so that the regulating portion 145 is displaced between a regulating position (solid line of FIG. 13) in which the regulating portion 145 is overlapped with the mounting hole 142 and a retracting position (two-dot chain line of FIG. 13) in which the regulating portion 145 is not overlapped with the mounting hole 142 when viewed in the inserting direction D1. The surface on the attaching direction D2 side of the regulating portion 145 is a perpendicular surface orthogonal to the attaching direction D2, and the surface on the inserting direction D1 side of the regulating portion 145 is an inclined surface oriented downward at the inserting direction D1 side. The distance between the regulating portion 145 and the end portion 55 of the connector 50 or the height of the regulating portion 145 are similar to the first embodiment, so that detailed descriptions thereof are omitted.

When inserting the connector 50 to the mounting hole 142, the leading-edge portion 56 at the lower side of the connector 50 presses the inclined surface of the regulating portion 145 downward, and the elastic portion 147 is elastically deformed downward as illustrated by the two-dot chain line of FIG. 13. As described, the connector 50 can be inserted in a state where the attaching direction D2 of the connector 50 is maintained in parallel with the inserting direction D1. Thereby, the operator can assemble the connector 50 similar to a conventional connector unit without the regulating portion 145, and the mounting operation of the connector 50 can be performed without discomfort.

After the end portion 55 of the connector 50 had passed the regulating portion 145, the regulating portion 145 is returned to its original position. Since the surface of the attaching direction D2 side of the regulating portion 145 is a perpendicular surface, even if the connector 50 is pushed toward the inserting direction D1 and the hook portions 53 of the connector 50 are disengaged, the elastic portion 147 will not deform elastically when the end portion 55 of the connector 50 abuts against the regulating portion 145. Therefore, the connector 50 can be prevented from falling.

As described, according to the connector unit 140 of the present embodiment, the connector mounting member 141 is equipped with the regulating portion 145, so that even if the connector 50 is pushed toward the inserting direction D1 and the hook portions 53 are disengaged, the end portion 55 of the connector 50 will abut against the regulating portion 145. Therefore, even if the counterpart connector 60 is pushed toward the connector 50 in a state where the orientations or shapes of the connectors are not compatible, it becomes possible to suppress the connector 50 from being disengaged from the mounting hole 142 and falling into the casing. As described, a fall prevention structure capable of preventing the connector 50 from falling into the apparatus body 2 can be realized. Further, since the fall prevention structure can be acquired by a simple configuration without increasing the number of components, it can be realized at a low cost.

Third Embodiment

Next, a third embodiment of the present invention will be described in detail with reference to FIGS. 14A, 14B, and 15. The configuration of a connector unit 240 according to the present embodiment differs from the configuration of the first embodiment in that protruded portions 249 are provided at an edge portion 242d of a mounting hole 242 of a panel portion 243. The other configurations are similar to the first embodiment, so that they are assigned with the same reference numerals, and detailed descriptions thereof are omitted.

Now, a connector unit 540 that is not provided with the protruded portions 249 (refer to FIG. 15) will be described as a reference example with reference to FIG. 16. As illustrated in FIG. 16, according to the reference example, a connector mounting member 541 includes a panel portion 543, a mounting hole 542 formed on the panel portion 543, and an extending portion 544. The connector mounting member 541 is not equipped with the protruded portions 249 (refer to FIG. 15), so that a contact area between the connector mounting member 541 and the respective surfaces of an upper surface 50a and a lower surface 50b of the connector 50 is limited to an inner surface of the mounting hole 542, that is, limited to a thickness of the panel portion 543. Therefore, if there is tolerance or play in the mounting hole 542, the connector 50 will easily fluctuate vertically with a lower surface 542c or an upper surface 542e of the mounting hole 542 serving as a pivot axis, as illustrated by the two-dot chain line.

If the above-mentioned fluctuation occurs in a state where force in the inserting direction D1 is applied to the connector 50, the engaging surfaces 53a (refer to FIG. 5) of the hook portions 53 of the connector 50 will not abut against the edge portion of the mounting hole 542 by surface contact, and they will abut against the end portion by point contact. As a result, stress concentrates at the end portions of the engaging surfaces 53a of the hook portions 53 of the connector 50, so that distortion is started at those points, and finally, the entire engaging surfaces 53a are subjected to distortion, so that the connector 50 can no longer be retained and the connector 50 may be disengaged and fall from the mounting hole 542. Therefore, according to the present embodiment, the connector 50 is suppressed from fluctuating vertically with respect to the mounting hole 542 so as to prevent the connector 50 from falling.

Figure 14A:
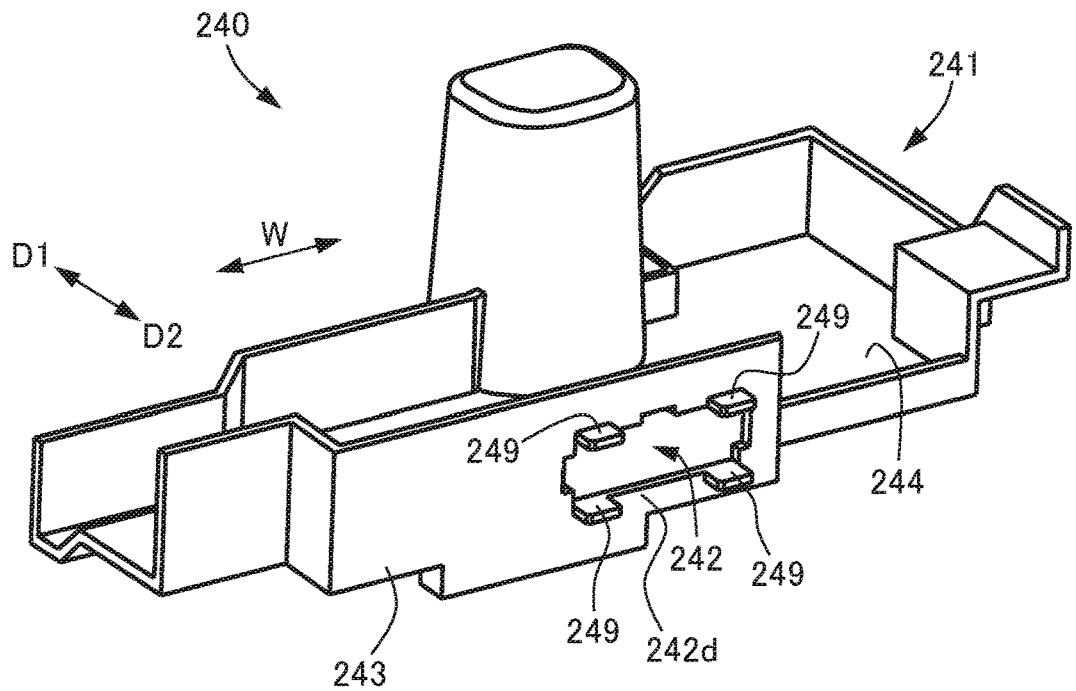
FIG. 14A is a perspective view of a connector unit according to a third embodiment, illustrating a state before mounting a connector.
Figure 14B:
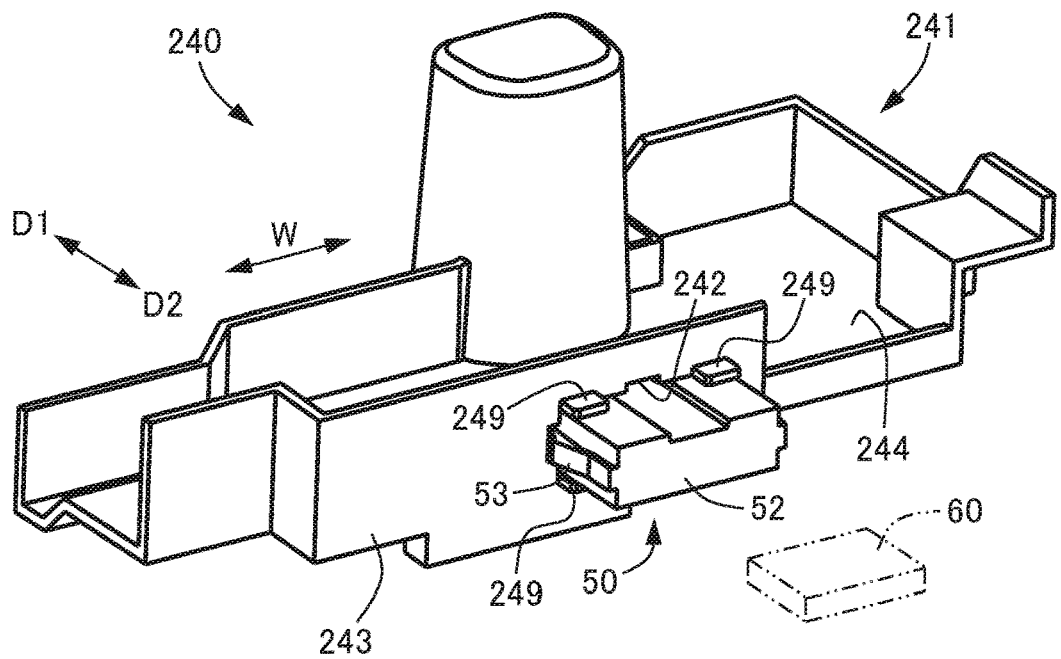
FIG. 14B is a perspective view of the connector unit according to the third embodiment, illustrating a state after mounting the connector.
Figure 15:
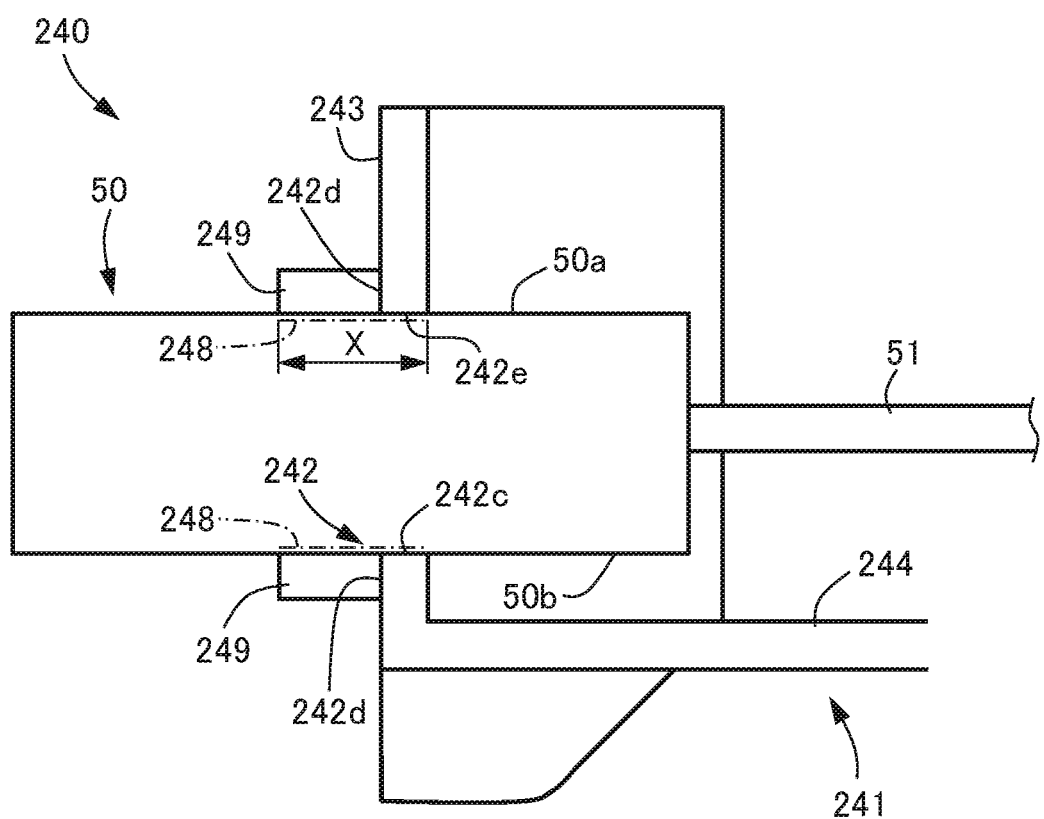
FIG. 15 is a cross-sectional view of the connector unit according to the third embodiment.
Figure 16:
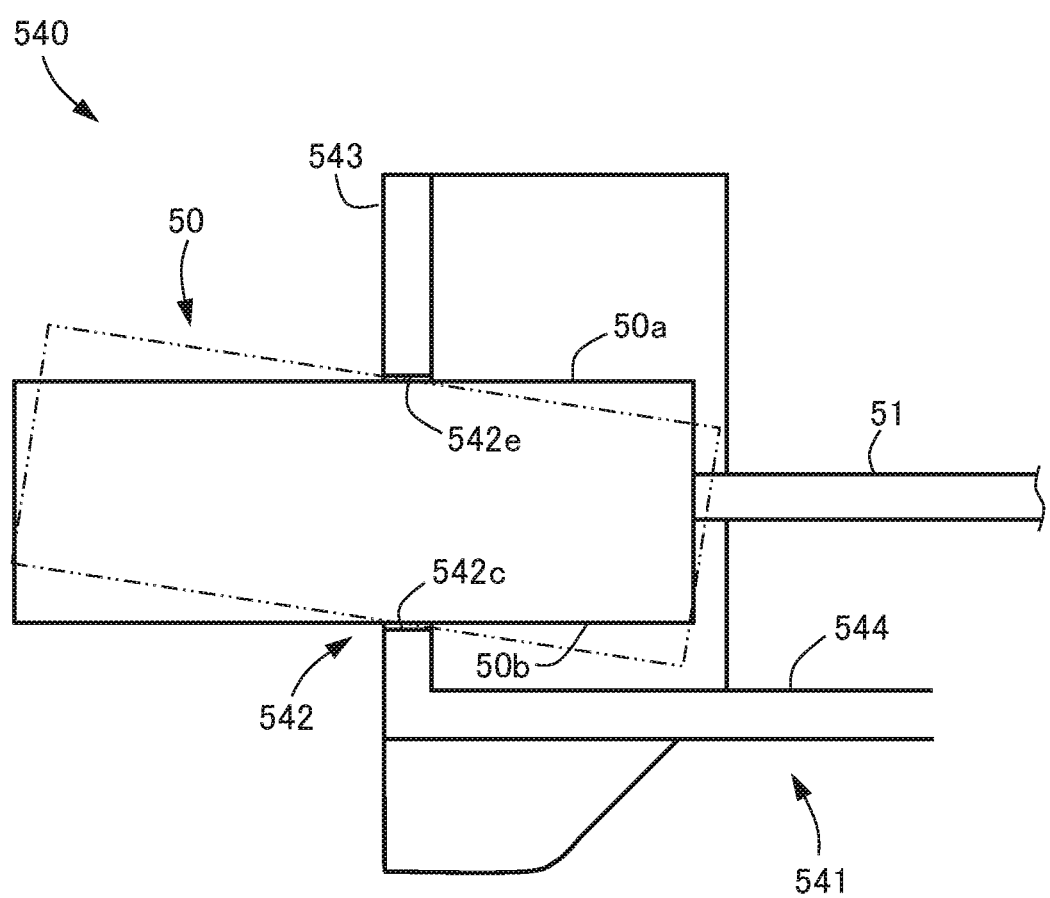
FIG. 16 is a cross-sectional view of a connector unit according to a reference example, illustrating a state where the connector has received external force and is tilted.

According to the present embodiment, as illustrated in FIGS. 14A, 14B, and 15, a connector mounting member 241 includes the panel portion 243, the mounting hole 242 formed on the panel portion 243, and an extending portion 244. The connector mounting member 241 includes protruded portions 249 projected from the edge portion 242d of the mounting hole 242 of the panel portion 243. The protruded portions 249 are provided on the edge portion 242d excluding the edge portion where the hook portions 53 are engaged with the mounting hole 242. According to the present embodiment, the protruded portions 249 are projected from the panel portion 243 toward the attaching direction D2, i.e., toward an upstream side in the inserting direction D1. According further to the present embodiment, the protruded portions 249 are projected from the panel portion 243 toward the attaching direction D2, but the present disclosure is not limited thereto, and the protruded portions 249 can be projected toward at least one of the upstream side or the downstream side in the inserting direction D1. That is, the protruded portions 249 can be provided on one side or both sides in the attaching direction D2 of the edge portion 242d.

According to the present embodiment, the protruded portions 249 are each provided on upper and lower edge portions 242d of the mounting hole 242, that is, on a pair of opposing edge portions 242d excluding the edge portions with which the hook portions 53 of the mounting hole 242 are engaged. Further, a length X (refer to FIG. 15) in the inserting direction D1 of the protruded portions 249 and the edge portion 242d on which the protruded portions 249 are provided is set longer than a maximum length Y (refer to FIG. 6A) in the inserting direction D1 at which the hook portions 53 can engage with the mounting hole 242.

The protruded portions 249 include an area 248 which is flush with a lower side 242c and an upper side 242e of the mounting hole 242. When the connector 50 is mounted to the mounting hole 242, the upper surface 50a and the lower surface 50b of the connector 50 comes into contact with the area 248 composed of the protruded portions 249 and the mounting hole 42. As described, by providing the protruded portions 249 and increasing the contact area with the upper surface 50a and the lower surface 50b of the connector 50, vertical fluctuation of the connector 50 after mounting can be suppressed. Thereby, the engaging surfaces 53a of the hook portions 53 of the connector 50 can be prevented from being in point contact with the panel portion 43, so that distortion of the engaging surfaces 53a will not easily occur, and the connector 50 is suppressed from being pushed in the inserting direction D1 and disengaged.

As described, according to the connector unit 240 of the present embodiment, since the connector mounting member 241 includes the protruded portions 249, the protruded portions 249 suppress the connector 50 from being tilted in the vertical direction and causing the hook portions 53 to be disengaged when the connector 50 is pushed in the inserting direction D1. As described, the present embodiment realizes a fall prevention structure of preventing the connector 50 from falling into the apparatus body 2. Further, since the structure can be achieved without increasing the number of components by a simple configuration of additionally providing the protruded portions 249 to the panel portion 243 to which the mounting hole 242 is formed, it can be realized at a low cost. Since the structure is simple, there is little design limitations, and it is applicable to a wide use.

According further to the connector unit 240 of the present embodiment, the protruded portions 249 are provided on both the upper and lower edge portions 242d of the mounting hole 242, so that the vertical fluctuation of the connector 50 after mounting can be suppressed effectively.

According further to the connector unit 240 of the present embodiment, the length X of the edge portion 242d and the protruded portions 249 in the inserting direction D1 is set longer than the maximum length Y of the engaging area in the inserting direction D1 at which the hook portions 53 can engage with the mounting hole 242. Therefore, sufficient length of the length X can be ensured, and the vertical fluctuation of the connector 50 after mounting can be suppressed effectively.

According to the third embodiment described above, the protruded portions 249 are provided on each of the upper and lower edge portions 242d of the mounting hole 242, but the present disclosure is not limited thereto, and the protruded portions 249 can be provided only on either one of the upper and lower edge portions 242d. Further according to the present embodiment, the length X of the edge portion 242d and the protruded portions 249 in the inserting direction D1 is set longer than the maximum length Y in the inserting direction D1 at which the hook portions 53 can engage with the mounting hole 242, but the present disclosure is not limited thereto. For example, even if the length X is equal to or shorter than the length Y, the vertical fluctuation of the connector 50 after mounting can be suppressed.

Fourth Embodiment

Figure 17A:
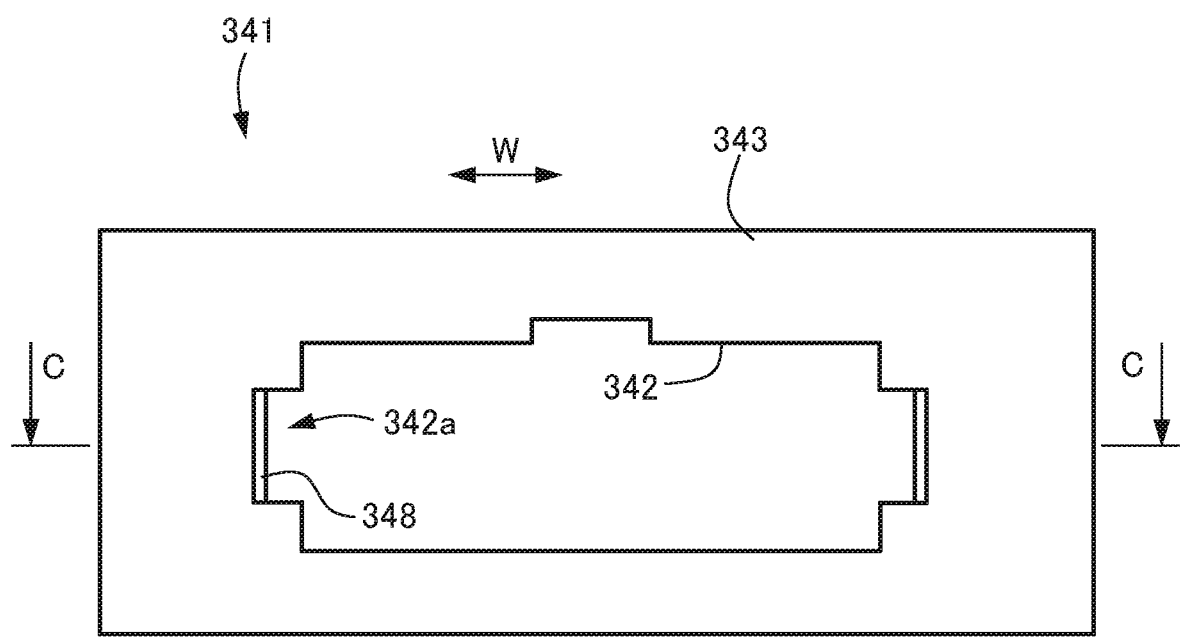
FIG. 17A is a front view of a connector mounting member according to a fourth embodiment.
Figure 17B:
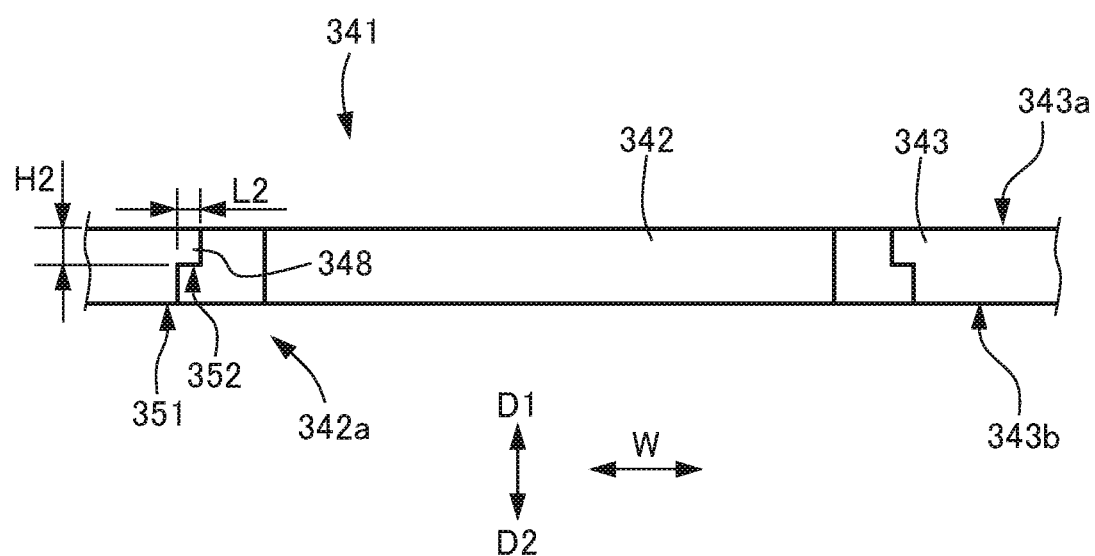
FIG. 17B is a cross-sectional view of the connector mounting member according to the fourth embodiment.
Figure 18:
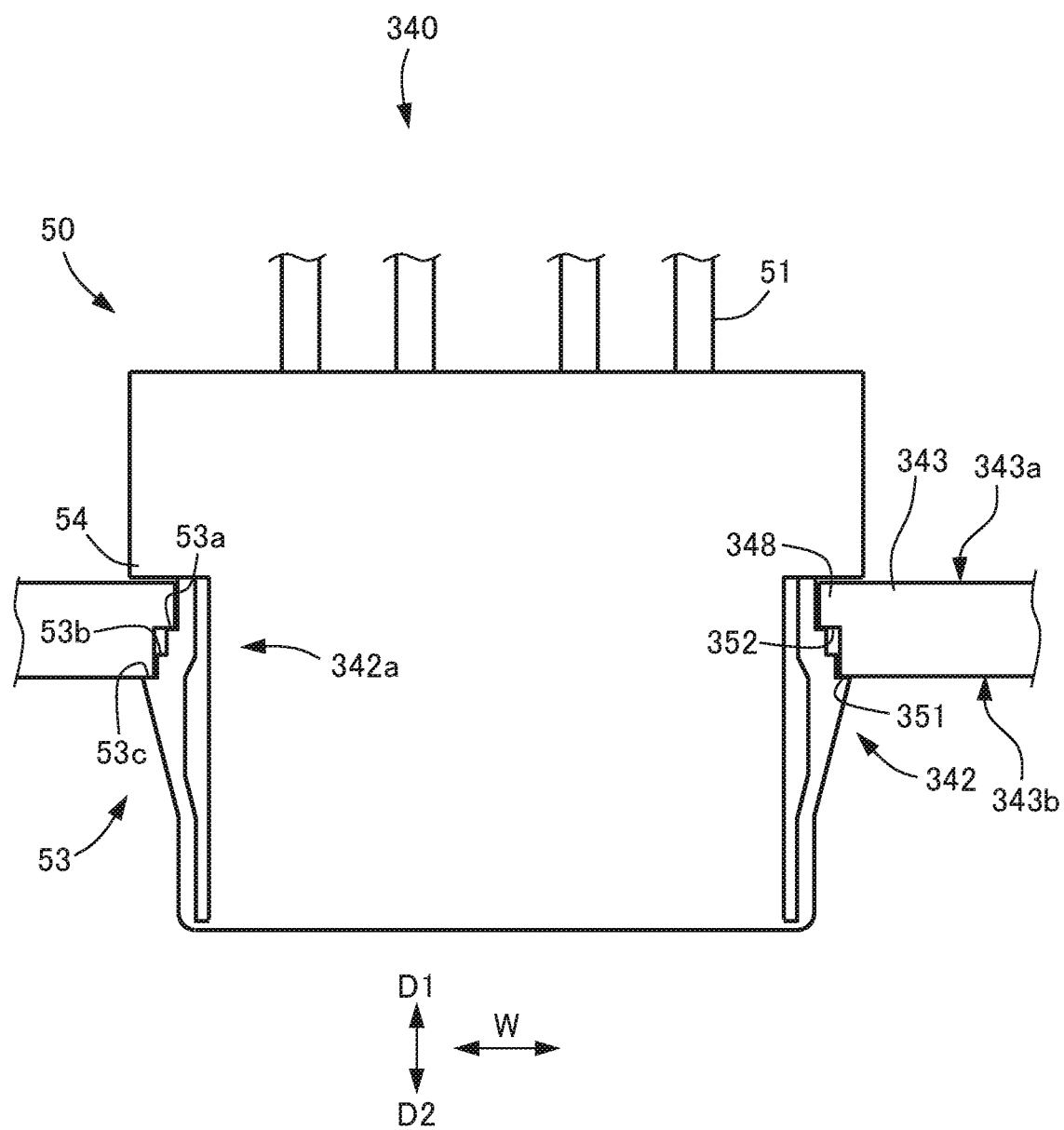
FIG. 18 is a cross-sectional view of the connector unit according to the fourth embodiment.

Next, a fourth embodiment of the present invention will be described in detail with reference to FIGS. 17A, 17B, and 18. A connector unit 340 according to the present embodiment differs from the configuration of the first embodiment in that a step portion 348 is provided on side edge portions 342a which are edge portions of a mounting hole 342 with which the hook portions 53 engage. The other configurations are similar to the first embodiment, so that they are assigned with the same reference numerals, and detailed descriptions thereof are omitted.

The connector unit 340 according to the present embodiment will be described with FIGS. 17A, 17B, and 18. FIG. 17A is a front view of a connector mounting member 341 illustrating the mounting hole 342 from a panel portion 343 side, FIG. 17B is a cross-sectional view taken at line C-C of FIG. 17A, and FIG. 18 is a cross-sectional view of a state where the connector 50 is mounted. Step portions 348 are provided to the side edge portions 342a of the mounting hole 342 of the connector mounting member 341. Each step portion 348 includes a plane flush with an inner side surface 343a of the panel portion 343, and the step portion 348 is projected toward a center of the mounting hole 342 in the width direction W at the inserting direction D1 side of the side edge portions 342a of the mounting hole 342. In the present embodiment, a projection length L2 of each step portion 348 from the side edge portion 342a is, for example, 0.5 mm. Further, a length H2 of the step portion 348 in the inserting direction D1 is, for example, 0.8 mm. A thickness of the panel portion 343 in the inserting direction D1 is, for example, 1.6 mm, and the step portion 348 occupies half the length of the mounting hole 342 in the inserting direction D1.

The connector mounting member 341 includes a first engaged surface 351 and a second engaged surface 352 that are formed to face the attaching direction D2 at each of the side edge portions 342a. The first engaged surface 351 is provided on an outer surface 343b of the panel portion 343. The second engaged surface 352 is formed by the plane of the step portion 348 in the attaching direction D2, and it is arranged toward the inserting direction D1 and on the inner side in the width direction W than the first engaged surface 351. Meanwhile, as illustrated in FIG. 18, the hook portions 53 each include the engaging surface 53c which is an example of a first engaging surface and the engaging surface 53a which is an example of a second engaging surface, which are formed to face the inserting direction D1. The engaging surfaces 53a are arranged toward the inserting direction D1 and on the inner side in the width direction W than the engaging surfaces 53c.

In a state where the connector 50 is mounted to the mounting hole 342, the engaging surfaces 53c of the hook portions 53 are engaged with the first engaged surfaces 351 and the engaging surfaces 53a are engaged with the second engaged surface 352, by which the connector 50 is retained. If the step portions 348 are not provided on the side edge portions 342a, the connector 50 will be engaged via one engaging surface, for example, the engaging surface 53a, on each of the two side edge portions 342a. Meanwhile, according to the present embodiment, the connector 50 is engaged via two engaging surfaces 53a and 53c with each of the side edge portions 342a. Therefore, if external force is applied to the connector 50 from the inserting direction D1 to the mounting hole 342, the force acting on one engaging surface of the hook portion 53 will be dispersed, so that distortion of the engaging surface will not easily occur, and disengagement of the connector 50 is suppressed.

As described, according to the connector unit 340 of the present embodiment, the connector mounting member 341 includes step portions 348 formed at the side edge portions 342a of the mounting hole 342. Therefore, the connector 50 can be engaged therewith via two surfaces, which are the engaging surface 53a and the engaging surface 53c, provided on each hook portion 53, so that compared to a case where the connector 50 is engaged only via one surface, disengagement of the hook portions 53 by the connector 50 being pushed toward the inserting direction D1 can be suppressed. As described, the present embodiment realizes a fall prevention structure capable of preventing the connector 50 from falling into the apparatus body 2. Further, since the structure can be achieved without increasing the number of components by a simple configuration of changing the shape of the inner side portion of the mounting hole 342, it can be realized at a low cost. Since the structure is simple, there is little design limitations, and it is applicable to a wide use.

OTHER EMBODIMENTS

In the fourth embodiment described above, only one step is provided in the step portion 348 of each side edge portion 342a, but the present disclosure is not limited thereto, and two or more step portions can be provided.

Further according to the first to fourth embodiments described above, an example has been illustrated of a case where the connector unit 40, 140, 240, or 340 is applied to a connecting portion between the image forming apparatus 1 and the sheet cassette apparatus 8, but the present disclosure it not limited thereto. For example, it is applicable to a relay provided on a connection path that connects an AC driver circuit board not shown and a fixing unit provided inside the image forming apparatus 1, or to a relay provided on a connection path that connects a power supply circuit board and various units. Further, it is applicable to a relay of a connection path that connects the connector unit 40, 140, 240, or 340 with another circuit board provided inside the image forming apparatus 1. In these cases, for example, during assembling operation of the image forming apparatus 1, the connector can be prevented from being disengaged during connection operation of the connector. Further, the connector unit 40, 140, 240, or 340 is not limited to being provided on the image forming apparatus 1, and for example, it can be applied to a connecting portion between a power supply circuit board and a cassette heater provided inside the sheet cassette apparatus 8.

Figure 19:
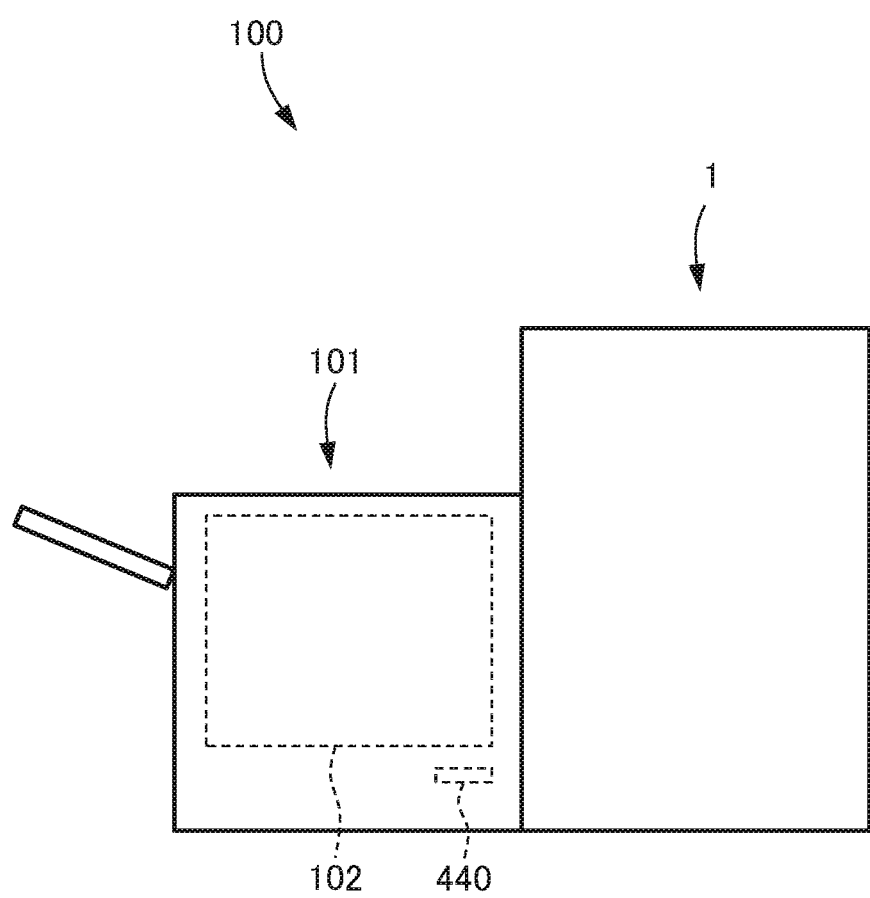
FIG. 19 is a schematic view of a sheet processing apparatus according to another embodiment.

Further, the connector unit 40, 140, 240, or 340 can be applied to another optional apparatus of the image forming apparatus 1, such as a sheet processing apparatus including a staple unit for carrying out a binding process to sheets, or to a sheet processing apparatus for carrying out other processes such as punching and sorting. For example, as illustrated in FIG. 19, an image forming system 100 includes the image forming apparatus 1 and a sheet processing apparatus 101. The sheet processing apparatus 101 includes a binding unit 102 that performs a binding process to the sheets S, and a connector unit 440. The connector unit 440 mentioned here is for connecting the sheet processing apparatus 101 and the image forming apparatus 1, or for connecting the binding unit 102 and a power supply circuit board not shown in the sheet processing apparatus 101.

Further, the first to fourth embodiments were illustrated based on a case where the connector unit 40, 140, 240, or 340 is provided on the image forming apparatus 1, the sheet cassette apparatus 8, or the sheet processing apparatus 101, but the present disclosure is not limited thereto. The connector unit 40, 140, 240, or 340 can be applied as a general-purpose connector unit.

Even further, configurations of a plurality of embodiments among the first to fourth embodiments described above can be applied to one connector unit. For example, the connector unit can adopt the configurations of both the first and fourth embodiments, or the connector unit can adopt the configurations of both the second and third embodiments.

The present invention enables to suppress the connector mounted to a panel from being disengaged and falling into the casing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-021683, filed Feb. 15, 2021 which is hereby incorporated by reference herein in its entirety.

What is claimed is:

1. A connector unit comprising:
   a connector mounting member having a mounting hole; and
   a connector configured to be passed through the mounting hole and attached to the connector mounting member,
   wherein the connector includes a terminal portion to which another connector is configured to be connected, and a hook portion engaged with an edge portion of the mounting hole, and
   wherein the connector mounting member includes:
   a panel portion on which the mounting hole is formed,
   an extending portion extending from the panel portion along an inserting direction of the other connector with respect to the connector, and
   an inclined rib that is inclined from the extending portion toward an end of the mounting hole.

2. The connector unit according to claim 1, wherein the connector mounting member further includes:
   a regulating portion projected from the extending portion at a position abutting against or close to an end portion opposite to the terminal portion of the connector in the inserting direction.

3. The connector unit according to claim 2, wherein a distance between the regulating portion and the panel portion is shorter than a distance between the terminal portion of the connector and the end portion.

4. The connector unit according to claim 2, wherein an upper end of the regulating portion is positioned at a position lower than an upper end of the mounting hole when viewed in the inserting direction.

5. The connector unit according to claim 2, wherein a height of the regulating portion from the extending portion is lower than a center point of the mounting hole when viewed in the inserting direction.

6. The connector unit according to claim 2, wherein the extending portion includes an elastic portion that is elastically deformable and configured to deform to a regulating position where the regulating portion is overlapped with the mounting hole and to a retracting position where the regulating portion is not overlapped with the mounting hole when viewed in the inserting direction.

7. The connector unit according to claim 1, wherein the connector mounting member is formed of resin.

8. An image forming apparatus comprising:
   an image forming unit configured to form an image on a recording material; and
   the connector unit according to claim 1.

9. An image forming apparatus comprising:
   an image forming unit configured to form an image on a recording material;
   a casing accommodated the image forming unit;
   the connector unit according to claim 1, the connector unit being provided on the casing; and
   a storage portion provided below the casing in a vertical direction, the storage portion configured to accommodate a sheet to be supplied to the image forming unit, the storage portion including the other connector.

10. A sheet processing apparatus comprising:
    a binding unit configured to perform a binding process to a recording material; and
    the connector unit according to claim 1.

* * * * *